US012562286B2

(12) United States Patent
Gates

(10) Patent No.: US 12,562,286 B2
(45) Date of Patent: Feb. 24, 2026

(54) SYSTEM AND METHOD FOR STELLARATOR NEUTRON SOURCE

(71) Applicant: THE TRUSTEES OF PRINCETON UNIVERSITY, Princeton, NJ (US)

(72) Inventor: David Gates, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 18/119,978

(22) Filed: Mar. 10, 2023

(65) Prior Publication Data

US 2023/0317304 A1 Oct. 5, 2023

Related U.S. Application Data

(60) Provisional application No. 63/319,588, filed on Mar. 14, 2022.

(51) Int. Cl.
*G21B 1/05* (2006.01)
*G21G 4/02* (2006.01)
*H05H 3/06* (2006.01)

(52) U.S. Cl.
CPC ............... *G21B 1/055* (2013.01); *G21G 4/02* (2013.01); *H05H 3/06* (2013.01)

(58) Field of Classification Search
CPC ...................................................... G21B 1/055
See application file for complete search history.

(56) References Cited

U.S. PATENT DOCUMENTS

| | | | | |
|---|---|---|---|---|
| 3,015,618 A * | 1/1962 | Stix | G21B 1/055 376/124 |
| 3,052,617 A | 9/1962 | Post | |
| 3,088,894 A | 5/1963 | Koenig | |
| 3,219,534 A * | 11/1965 | Furth | G21B 1/055 376/137 |
| 3,278,384 A * | 10/1966 | Lenard | G21B 1/055 376/140 |

(Continued)

FOREIGN PATENT DOCUMENTS

| | | |
|---|---|---|
| CN | 112786273 B | 9/2022 |
| WO | 2014039579 A2 | 3/2014 |

OTHER PUBLICATIONS

Neilson, G. H., et al. Progress toward attractive stellarators. No. PPPL-4589. Princeton Plasma Physics Lab.(PPPL), Princeton, NJ (United States), 2011. (Year: 2011).*

(Continued)

*Primary Examiner* — Lily C Garner
(74) *Attorney, Agent, or Firm* — Charney IP Law LLC; Thomas M. Finetti

(57) ABSTRACT

The present disclosure is directed to systems for generating neutrons, the systems including a stellarator optimized for fast particle finement. In some embodiments, the stellarator optimized for fast particle confinement is selected from a quasi-axisymmetric stellarator, a quasi-symmetric stellarator, a quasi-isodynamic stellarator, or a quasi-omnigenous stellarator. The present disclosure is also directed to methods of generating neutrons using the systems of the present disclosure and, in particular, systems incorporating a stellarator optimized for fast particle confinement.

15 Claims, 10 Drawing Sheets

(56) References Cited

U.S. PATENT DOCUMENTS

| | | | | | |
|---|---|---|---|---|---|
| 3,607,627 | A * | 9/1971 | Furth | G21B 1/055 376/134 |
| 3,779,864 | A * | 12/1973 | Kaw | H05H 1/18 376/143 |
| 3,801,438 | A | 4/1974 | Ohkawa | |
| 4,007,392 | A | 2/1977 | Valfells et al. | |
| 4,663,109 | A | 5/1987 | Reiman et al. | |
| 4,735,765 | A | 4/1988 | Harris et al. | |
| H554 | H * | 12/1988 | Dawson | H05H 1/12 376/140 |
| 4,826,646 | A * | 5/1989 | Bussard | H05H 1/11 376/127 |
| 7,994,724 | B2 | 8/2011 | Dine | |
| 8,124,906 | B2 | 2/2012 | Holber et al. | |
| 8,134,440 | B2 | 3/2012 | Beckenbach et al. | |
| 8,324,814 | B2 | 12/2012 | Pelletier et al. | |
| 8,383,525 | B2 | 2/2013 | Raisanen et al. | |
| 8,496,872 | B1 | 7/2013 | Weires et al. | |
| 8,590,485 | B2 | 11/2013 | Biloiu et al. | |
| 8,648,534 | B2 | 2/2014 | You et al. | |
| 9,036,765 | B2 | 5/2015 | Birnbach | |
| 9,947,511 | B2 | 4/2018 | Ando et al. | |
| 9,967,963 | B2 | 5/2018 | Zindler et al. | |
| 10,639,492 | B2 | 5/2020 | Cook | |
| 10,744,338 | B2 | 8/2020 | Cook | |
| 10,811,144 | B2 | 10/2020 | Laberge et al. | |
| 11,646,139 | B2 | 5/2023 | Xu et al. | |
| 2008/0285700 | A1 | 11/2008 | Davis | |
| 2009/0231583 | A1 | 9/2009 | Smith | |
| 2015/0245461 | A1* | 8/2015 | Belchenko | H05H 3/02 250/251 |
| 2015/0380114 | A1* | 12/2015 | Park | H05H 1/11 376/144 |
| 2018/0207438 | A1 | 7/2018 | Cook | |
| 2019/0009902 | A1 | 1/2019 | Chan et al. | |
| 2019/0009903 | A1 | 1/2019 | Chan et al. | |
| 2022/0208397 | A1 | 6/2022 | Xu et al. | |
| 2023/0290525 | A1* | 9/2023 | Gates | H01F 6/06 |

OTHER PUBLICATIONS

Zhu, Caoxiang, et al. "Designing stellarators using perpendicular permanent magnets." Nuclear Fusion 60.7 (2020): 076016. (Year: 2020).*

Brown, T., et al. "Engineering optimization of stellarator coils lead to improvements in device maintenance." 2015 IEEE 26th Symposium on Fusion Engineering (SOFE). IEEE, 2015. (Year: 2015).*

Brown, T. G. "Three confinement systems-spherical tokamak, standard tokamak, and stellarator: a comparison of key component cost elements." IEEE Transactions on Plasma Science 46.6 (2018): 2216-2230. (Year: 2018).*

Li, Jessica L., et al. "Large vacuum flux surfaces generated by tilted planar coils." Plasma physics and controlled fusion 61.7 (2019): 075005. (Year: 2019).*

Gates, D. A., et al. "Recent advances in stellarator optimization." Nuclear Fusion 57.12 (2017): 126064. (Year: 2017).*

Menard, Jonathan. "Progress and plans for NSTX Upgrade and prospects for next-step spherical tori." University of California Berkeley (2016). (Year: 2016).*

Gerhardt, S. P., R. Andre, and J. E. Menard. "Exploration of the equilibrium operating space for NSTX-Upgrade." Nuclear Fusion 52.8 (2012): 083020. (Year: 2012).*

Menard, J. E., et al. "Overview of the physics and engineering design of NSTX upgrade." Nuclear Fusion 52.8 (2012): 083015. ( Year: 2012).*

Gates, David A., et al. "Stellarator research opportunities: a report of the national stellarator coordinating committee." Journal of Fusion Energy 37 (2018): 51-94. (Year: 2018).*

Helander, P., et al. "Stellarators with permanent magnets." Physical review letters 124.9 (2020): 095001. (Year: 2020).*

USH554H. Dawson et al. 1988. (Year: 1988).*

Lehnert, B. 1975. "On Magnetically Confined Plasmas Used as Neutron Sources." Nuclear Instruments and Methods 129 (1): 27-30. https://doi.org/10.1016/0029-554X(75)90106-8.

Kolesnichenko, Ya I., and S. N. Reznik. 1976. "The D-D Nuclear Fusion Reaction in a Hybrid Reactor." Nuclear Fusion 16 (1): 97. https://doi.org/10.1088/0029-5515/16/1/010.

Hendel, H. W., and D. L. Jassby. 1990. "The Tokamak as a Neutron Source." Nuclear Science and Engineering 106 (2): 114-37. https://doi.org/10.13182/NSE90-A27465.

Dawson, J. M., H. P. Furth, and F. H. Tenney. 1971. "Production of Thermonuclear Power by Non-Maxwellian Ions in a Closed Magnetic Field Configuration." Physical Review Letters 26 (19): 1156-60. https://doi.org/10.1103/PhysRevLett.26.1156.

Jassby, D. L. 1977. "Neutral-Beam-Driven Tokamak Fusion Reactors." Nuclear Fusion 17 (2): 309. https://doi.org/10.1088/0029-5515/17/2/015.

Price, Robert E., Geoffrey W. Shuy, and James T. Woo. 1986. "Deuterium Driven D—T Fusion Reactor Test Facility." Fusion Technology 10 (3P2B): 1412-17. https://doi.org/10.13182/FST86-A24926.

Forest, Cary, Jay Anderson, Dan Brunner, Jan Egedal, Ken Fowler, Alexander Ivanov, Bob Harvey, et al. 2020. "The WHAM (Wisconsin HTS Axisymmetric Mirror) Neutron Source and End Plug On a Low Cost Path to BEAT: Break Even Axisymmetric Tandem." PPPL Colloquium, Princeton Plasma Physics Laboratory, Princeton, NJ, USA, Oct. 14. https://pppl-intranet.princeton.edu/event/pppl-colloquium-cary-forest-university-of-wisconsin-madison-the-wisconsin-axisymmetric-mirror.

International Search Report for PCT/US2023/064025, filed on Mar. 9, 2023.

Heikkinen, D. W. 1988. "RTNS-II (Rotating Target Neutron Source II) Operational Summary." UCRL-98946; CONF-881151-13. Lawrence Livermore National Lab., CA (USA). https://www.osti.gov/biblio/6816875.

Hendel, H. W., A. C. England, D. L. Jassby, A. A. Mirin, and E. B. Nieschmidt. 1986. "Fusion-Neutron Production in the TFTR with Deuterium Neutral-Beam Injection." Journal of Fusion Energy 5 (3): 231-44. https://doi.org/10.1007/BF01050616.

Seki, Ryosuke, Kunihiro Ogawa, Mitsutaka Isobe, Masayuki Yokoyama, Sadayoshi Murakami, Hideo Nuga, Shuji Kamio, Yutaka Fujiwara, Masaki Osakabe, and LHD Experiment Group. 2019. "Evaluation of Neutron Emission Rate with FIT3D-DD Code in Large Helical Device." Plasma and Fusion Research 14: 3402126-3402126. https://doi.org/10.1585/pfr.14.3402126.

Hemsworth, R. S., D. Boilson, P. Blatchford, M. Dalla Palma, G. Chitarin, H. P. L. de Esch, F. Geli, et al. 2017. "Overview of the Design of the ITER Heating Neutral Beam Injectors." New Journal of Physics 19 (2): 025005. https://doi.org/10.1088/1367-2630/19/2/025005.

Helander, Per. 2014. "Theory of Plasma Confinement in Non-Axisymmetric Magnetic Fields." Reports on Progress in Physics 77 (8): 087001. https://doi.org/10.1088/0034-4885/77/8/087001.

Dinklage, A., C. D. Beidler, P. Helander, G. Fuchert, H. Maaßberg, K. Rahbarnia, T. Sunn Pedersen, et al. 2018. "Magnetic Configuration Effects on the Wendelstein 7-X Stellarator." Nature Physics 14 (8): 855-60. https://doi.org/10.1038/s41567-018-0141-9.

Canik, J. M., D. T. Anderson, F. S. B. Anderson, K. M. Likin, J. N. Talmadge, and K. Zhai. 2007. "Experimental Demonstration of Improved Neoclassical Transport with Quasihelical Symmetry." Physical Review Letters 98 (8): 085002. https://doi.org/10.1103/PhysRevLett.98.085002.

Landreman, Matt, and Elizabeth Paul. 2022. "Magnetic Fields with Precise Quasisymmetry for Plasma Confinement." Physical Review Letters 128 (3): 035001. https://doi.org/10.1103/PhysRevLett.128.035001.

Williamson, D., A. Brooks, T. Brown, M. Cole, H.-M. Fan, P. Goranson, M. Hechler, P. Heitzenroeder, B. Nelson, and W.T. Reiersen. 1999. "Design Description of the Saddle Coils for the National Compact Stellarator Experiment (NCSX)." In 18th IEEE/NPSS Symposium on Fusion Engineering. Symposium Proceedings (Cat. No.99CH37050), 441-44. https://doi.org/10.1109/FUSION.1999.849874.

(56) References Cited

OTHER PUBLICATIONS

Yoshimura, Y., S. Kubo, T. Shimozuma, H. Igami, T. Mutoh, Y. Nakamura, K. Ohkubo, et al. 2005. "Achievement of One Hour Discharge with ECH on LHD." Journal of Physics: Conference Series 25 (1): 189. https://doi.org/10.1088/1742-6596/25/1/024.
Beidler, Craig, Günter Grieger, Franz Herrnegger, Ewald Harmeyer, Johann Kisslinger, Wolf Lotz, Henning Maassberg, et al. 1990. "Physics and Engineering Design for Wendelstein VII-X." Fusion Technology 17 (1): 148-68. https://doi.org/10.13182/FST90-A29178.
Neilson, GH, A Brooks, D Johnson, H Kugel, R Majeski, W Reierson, M Zarnstorff, et al. 2000. "NCSX Machine Configuration Design Progress." In Proceedings of the 42nd Annual Meeting of the APS Division of Plasma Physics Combined with the 10th International Congress on Plasma Physics October. Québec City, Canada: American Physical Society. https://pdfs.semanticscholar.org/ae61/55495dc12fc564d69b0ae9f3e2c444edc5e5.pdf.
Rummel, Thomas, Konrad Risze, Johann Kiszlinger, Matthias Koppen, Frank Fullenbach, Hutch Neilson, Tom Brown, and Subrahmanya Ramakrishnan. 2012. "The Trim Coils for the Wendelstein 7-X Magnet System." IEEE Transactions on Applied Superconductivity 22 (3): 4201704-4201704. https://doi.org/10.1109/TASC.2011.2182027.
Todd, T. N. 1990. "Ultra-Simple Stellarators." Plasma Physics and Controlled Fusion 32 (6): 459. https://doi.org/10.1088/0741-3335/32/6/004.
Pedersen, Thomas Sunn, Allen H. Boozer, Jason Paul Kremer, Remi G. Lefrancois, Wayne T. Reiersen, Fred Dahlgren, and Neil Pomphrey. 2004. "The Columbia Nonneutral Torus: A New Experiment to Confine Nonneutral and Positron-Electron Plasmas in a Stellarator." Fusion Science and Technology 46 (1): 200-208. https://doi.org/10.13182/FST04-A556.
Ku, Long-Poe, and Allen H. Boozer. 2009. "Nonaxisymmetric Shaping of Tokamaks Preserving Quasiaxisymmetry." Physics of Plasmas 16 (8): 082506. https://doi.org/10.1063/1.3207010.
Merkel, P. 1987. "Solution of Stellarator Boundary Value Problems with External Currents." Nuclear Fusion 27 (5): 867. https://doi.org/10.1088/0029-5515/27/5/018.
Landreman, Matt. 2017. "An Improved Current Potential Method for Fast Computation of Stellarator Coil Shapes." Nuclear Fusion 57 (4): 046003. https://doi.org/10.1088/1741-4326/aa57d4.
Hammond, K. C., C. Zhu, T. Brown, K. Corrigan, D. A. Gates, and M. Sibilia. 2020. "Geometric Concepts for Stellarator Permanent Magnet Arrays." Nuclear Fusion 60 (10): 106010. https://doi.org/10.1088/1741-4326/aba8dc.
Zhu, Caoxiang, Michael Zarnstorff, David Gates, and Arthur Brooks. 2020. "Designing Stellarators Using Perpendicular Permanent Magnets." Nuclear Fusion 60 (7): 076016. https://doi.org/10.1088/1741-4326/ab9006.
Sahinidis, Nikolaos V. 2019. "Mixed-Integer Nonlinear Programming 2018." Optimization and Engineering 20 (2): 301-6. https://doi.org/10.1007/s11081-019-09438-1.
Guodong Yu Zhichen Feng Peiyou Jiang Neil Pomphrey Matt Landreman Guoyong Fu: "A neoclassically optimized compact stellarator with four planar coils", arxiv.org, Cornell University Library, 201 Olin Library Cornell University Ithaca, NY 14853, Jun. 10, 2021 (Jun. 10, 2021).
Takeiri Y.: "Prospect Toward Steady-State 1-64 Helical Fusion Reactor Based on Progress of LHD Project Entering the Deuterium Experiment Phase", IEEE Transactions on Plasma Science., vol. 46, No. 5, Oct. 12, 2017 (Oct. 12, 2017) , pp. 1141-1148.
Isobe M et al: "Fusion neutron production with deuterium neutral beam injection and enhancement of energetic-particle physics study in the large helical device", Nuclear Fusion, Publishing Section. Vienna, AT, vol. 58, No. 8, Jun. 29, 2018 (Jun. 29, 2018).
Zarnstorff M C et al: "Simpler optimized stellarators using permanent magnets", Nuclear Fusion., Jun. 25, 2021 (Jun. 25, 2021) , pp. 1-4.
Zarnstorff M C: "Progress on the Stellarator Path to Fusion Power", Fusion Power Associates Meeting, Dec. 16, 2021 (Dec. 16, 2021) , pp. 1-15.
Caoxiang Zhu et al: "Topology 18-54 optimization of permanent magnet s for stellarators", Nuclear Fusion, Publishing Section. Vienna, AT, vol. 60, No. 10, Aug. 21, 2020 (Aug. 21, 2020), p. 106002.
Partial Search Report for PCT Application No. PCT/US2023/063949, filed on Mar. 8, 2023.
Murakami, S., A. Wakasa, H. Maaßberg, C. D. Beidler, H. Yamada, K. Y. Watanabe, and LHD Experimental Group. "Neoclassical Transport Optimization of LHD." Nuclear Fusion 42, No. 11 (Sep. 2002): L19. https://doi.org/10.1088/0029-5515/42/11/101.
Bellan, Paul M. Fundamentals of Plasma Physics. Cambridge: Cambridge University Press, 2006. https://doi.org/10.1017/CBO9780511807183.
Wesson, John. Tokamaks. Third Edition. Oxford: Clarendon Press, 2004.
Chen, Francis F. Introduction to Plasma Physics and Controlled Fusion. Cham: Springer International Publishing, 2016. https://doi.org/10.1007/978-3-319-22309-4.
Richardson, A. S. "NRL Plasma Formulary." Washington, DC 20375, USA: Naval Research Laboratory, 2019. https://www.nrl.navy.mil/ppd/content/nrl-plasma-formulary.
Freidberg, Jeffrey P. Ideal Magnetohydrodynamics. Plenum Publishing Company Limited, 1987.
Imbert-Gerard, Lise-Marie, Elizabeth J. Paul, and Adelle M. Wright. An Introduction to Stellarators: From Magnetic Fields to Symmetries and Optimization, 2019. https://arxiv.org/abs/1908.05360v2.
Helander, Per. "Theory of Plasma Confinement in Non-Axisymmetric Magnetic Fields." Reports on Progress in Physics 77, No. 8 (Jul. 2014): 087001. https://doi.org/10.1088/0034-4885/77/8/087001. lander.
Hudson, S. R., D. A. Monticello, A. H. Reiman, A. H. Boozer, D. J. Strickler, S. P. Hirshman, and M. C. Zarnstorff. "Eliminating Islands in High-Pressure Free-Boundary Stellarator Magnetohydrodynamic Equilibrium Solutions." Physical Review Letters 89, No. 27 (Dec. 20, 2002): 275003. https://doi.org/10.1103/PhysRevLett.89.275003.
Hastie, R. J., G. D. Hobbs, and J. B. Taylor. "Non-Adiabatic Behaviour of Particles in Inhomogeneous Magnetic Fields." Plasma Physics and Controlled Nuclear Fusion Research. Proceedings of the Third International Conference on Plasma Physics and Controlled Nuclear Fusion Research. vol. I, 1969. http://inis.iaea.org/Search/search.aspx?orig_q=RN:44064054.
Vaclavik, J., and K. Appert. "Theory of Plasma Heating by Low Frequency Waves: Magnetic Pumping and Alfvén Resonance Heating." Nuclear Fusion 31, No. 10 (Oct. 1991): 1945. https://doi.org/10.1088/0029-5515/31/10/013.
Nemov, V. V., S. V. Kasilov, W. Kernbichler, and M. F. Heyn. "Evaluation of 1/v Neoclassical Transport in Stellarators." Physics of Plasmas 6, No. 12 (Dec. 1, 1999): 4622-32. https://doi.org/10.1063/1.873749.
Grad, H. Containment in Cusped Plasma Systems. United States: N. p., 1961. Web.
Nagaoka, et. al., "Neutral Beam Injectors," https://www-lhd.nifs.ac.jp/pub/pdf/LHD_Guide/heating_devices/NBI.pdf (undated).

* cited by examiner

SYSTEM AND METHOD FOR STELLARATOR NEUTRON SOURCE

CROSS-REFERENCE TO RELATED APPLICATIONS

The present disclosure claims the benefit of the filing date of U.S. Provisional Patent Application No. 63/319,588 filed on Mar. 14, 2022, the disclosure of which is hereby incorporated by reference herein in its entirety.

STATEMENT REGARDING FEDERALLY SPONSORED RESEARCH

This invention was made with government support under Grant Nos. DE-AC02-09CH11466 awarded by the Department of Energy and DE-AR0001264 awarded by the Department of Energy/Advanced Research Projects Agency (ARPA-E). The government has certain rights in the invention.

FIELD OF THE DISCLOSURE

The present disclosure is generally directed to neutron sources and, in particular, systems for generating neutrons which include a stellarator capable of fast particle confinement.

BACKGROUND OF THE DISCLOSURE

Neutron sources, devices that can release neutrons, allow for the synthesis of useful isotopes. There are many types of neutron sources, from hand-held radioactive sources to research reactors and fission sources in neutron research facilities. Fusion neutron sources have been described for several applications. A common early concept was to use a blanket of fission fuel such as uranium or plutonium to generate energy. Lehnert (1975) and Kolesnichenko et al. (1976) present this possibility as a first logical step in fusion power (see Lehnert, B. 1975. Nuclear Instruments and Methods 129 (1): 27-30; see Kolesnichenko, Ya I., and S. N. Reznik. 1976. Nuclear Fusion 16 (1): 97). Hendel and Jassby (1990) list this application in their review on tokamak neutron source experimental results (see Hendel, H. W., and D. L. Jassby. 1990. Nuclear Science and Engineering 106 (2): 114-37).

The concept of using a beam of ions (sometimes injected as neutral atoms) and a plasma target to cause fusion events was developed in the 1970s as the “wet wood burner” concept, evoking the image that, if a plasma cannot ignite, an exterior source of heat can produce combustion. An early article describing the concept was authored by Dawson et al. (1971) (see Dawson, J. M., H. P. Furth, and F. H. Tenney. 1971. Physical Review Letters 26 (19): 1156-60). Dawson describes a system in which deuterium is injected via neutral beam into a cold tritium plasma, for the purpose of generating thermonuclear energy. Dawson's target plasma is contained in a torus, and the paper describes that the tokamak is the most practical choice for magnetic confinement.

Variations in the “wet wood burner” concept envision different types of devices for magnetic confinement of the plasma. Dawson et al. (1971), Jassby (1977), and Hendel and Jassby (1990) describe the use of a tokamak (see Jassby, D. L. 1977. Nuclear Fusion 17 (2): 309). Others describe less conventional plasma targets such as magnetic mirrors and screw taps. Lehnert (1975) describes high-density, low-temperature screw traps. Price et al. (1986) describe a high-pressure linear device like a magnetic mirror (see Price, Robert E., Geoffrey W. Shuy, and James T. Woo. 1986. Fusion Technology 10 (3P2B): 1412-17). Forest et al. (2020) describe a high-magnetic-field magnetic mirror (see Forest, Cary, et al. 2020. PPPL Colloquium, Princeton Plasma Physics Laboratory, Princeton, NJ, USA, October 14). SHINE technologies and Heikken (1988) describe systems in which the target is not in the plasma state, such as a solid-state target or a gas target (see SHINE Technologies, https://www.shinefusion.com/; see Heikkinen, D. W. 1988. UCRL-98946; CONF-881151-13. Lawrence Livermore National Lab., CA (USA). SHINE, Kolesnichenko et al. (1976), and Hendel et al. (1986) have recommended the injection of deuterium beams into a deuterium target, because of the greater availability and safety of deuterium.

The Large Helical Device (LHD), operated by the Japanese National Institute for Fusion Science and described by Seki et al. (2019) is a plasma physics experiment see (Seki, Ryosuke, et al. 2019. Plasma and Fusion Research 14: 3402126-3402126). The LHD has been configured to include negative ion-based neutral beam injectors, whereby the negative ion-based neutral beam has been injected into a deuterium plasma contained by a stellarator. While this reaction produced neutrons, this stellarator was not optimized for fast particle confinement and, as a result, the neutron generation rate was impractically low for any economic purpose. Furthermore, the purpose of the experiment was to support models of plasma physics to create a thermonuclear energy power plant, rather than the economic generation of neutrons.

SHINE's commercial fusion neutron sources have produced rates of $5\times10^{11}$ neutrons per second (n/s) for deuterium ions into a gaseous deuterium target and $3\times10^{13}$ n/s for deuterium ions into a gaseous tritium. The TFTR tokamak was configured to introduce deuterium beams into a deuterium plasma and, as a result, was in principle able to produce D-D neutrons at a rate of $1\times10^{17}$ n/s for brief pulses as part of a plasma physics experiment according to Hendel and Jassby (1990).

To-date, the creation of useful isotopes via neutron bombardment isa very costly process. Indeed, the isotopes produced according to such a process are incredibly expensive to manufacture and/or purchase in useful quantities. For example, tritium currently costs tens of thousands of dollars per gram on the open market. Future estimates for fusion power production indicate that about 300 grams of tritium would be required per day to produce about 800 MW of electrical power, which would require millions of dollars per day just of tritium.

It would be useful to develop a system that was able to produce a large quantity of neutrons to facilitate economical isotope production.

BRIEF SUMMARY OF THE DISCLOSURE

Disclosed herein are systems and methods for generating neutrons. In particular, the disclosed systems and methods disclosed herein utilize one or more stellarators optimized for fast particle confinement. Ions, such as deuterium ions, are accelerated via negative ion-based neutral beams to energies at which the deuterium-deuterium (“D-D”) fusion cross-section is significant (e.g., greater than at least 100 millibarns); and injected (as neutral atoms) into a stellarator that has been optimized for fast ion confinement to generate a flux of neutrons. These neutrons can be used to bombard one or more target materials (e.g., solid targets, liquid targets, gaseous targets) to generate a desired isotope.

A first aspect of the present disclosure is a system comprising: (i) a casing defining a first volume; (ii) a blanket defining a second volume, the blanket enveloping the casing; (iii) a stellarator optimized for fast particle confinement, wherein the stellarator is adapted to confine a plasma within the first volume, and wherein the stellarator encompasses the blanket; (iv) at least a first negative ion-based neutral beam injector for introducing high energy neutral atoms into the plasma in a first angular direction; (v) optionally at least a second negative ion-based neutral beam injector for introducing high energy neutral atoms into the plasma in a second angular direction; and (vi) an electron heater adapted to heat electrons in the plasma. In some embodiments, the plasma is a deuterium plasma.

In some embodiments, the system comprises at least 2 first negative ion-based neutral beam injectors for introducing the high energy neutral atoms into the plasma in the first angular direction. In some embodiments, the system comprises at least 4 first negative ion-based neutral beam injectors for introducing the high energy neutral atoms into the plasma in the first angular direction. In some embodiments, the system comprises at least 6 first negative ion-based neutral beam injectors for introducing the high energy neutral atoms into the plasma in the first angular direction.

In some embodiments, the system comprises at least one second negative ion-based neutral beam injector for introducing the high energy neutral atoms into the plasma in the second angular direction. In some embodiments, the first and second angular directions are opposite angular directions.

In some embodiments, the system comprises at least two second negative ion-based neutral beam injectors for introducing the high energy neutral atoms into the plasma in the second angular direction. In some embodiments, the first and second angular directions are opposite angular directions.

In some embodiments, the system further comprises at least one material transfer system. In some embodiments, a first of the at least one material transfer system is in communication with the first volume. In some embodiments, the first of the at least one material transfer system is communicatively coupled to a material isolation system. In some embodiments, a second of the at least one material transfer system is in communication with the second volume. In some embodiments, the second of the at least one material transfer system is communicatively coupled to a material isolation system. In some embodiments, the second of the at least one material transfer system is adapted for introducing a flowable target into the second volume. In some embodiments, the second of the at least one material transfer system is adapted for introducing a solid target into the second volume.

In some embodiments, the electron heater is communicatively coupled to a controller.

In some embodiments, the stellarator optimized for fast particle confinement is a quasi-axisymmetric stellarator. In some embodiments, the stellarator optimized for fast particle confinement is a quasi-symmetric stellarator. In some embodiments, the stellarator optimized for fast particle confinement is a quasi-isodynamic stellarator. In some embodiments, the stellarator optimized for fast particle confinement is quasi-omnigenous stellarator.

In some embodiments, the stellarator optimized for fast particle confinement comprises (a) a plurality of planar shaping coils, wherein an array comprising the plurality of planar shaping coils encircles the plasma axis, but where any individual planar shaping coil of the plurality of planar shaping coils does not encircle the plasma axis; and (b) a plurality of planar encircling coils, wherein each individual planar encircling coil of the plurality of encircling coils encircles the plasma axis.

In some embodiments, the stellarator optimized for fast particle confinement comprises (a) a field-shaping coil system including one or more field shaping units which define a void adapted to confine a plasma, wherein each field shaping unit comprises (i) one or more structural mounting elements; and (ii) one or more shaping coils disposed on a surface of the one or more structural mounting elements; and (b) a plurality of encircling coils which encircle the plasma and the field-shaping coil system, wherein the one or more shaping coils and the plurality of encircling coils are comprised of one or more superconducting materials.

In some embodiments, the stellarator optimized for fast particle confinement comprises (a) a void adapted to confine a plasma having a plasma axis; (b) a plurality of planar shaping coils, wherein an array comprising the plurality of planar shaping coils encircles the plasma axis, but where any individual planar shaping coil of the plurality of planar shaping coils does not encircle the plasma axis; and (c) a plurality of planar encircling coils, wherein each individual planar encircling coil of the plurality of encircling coils encircles the plasma axis.

In some embodiments, the stellarator optimized for fast particle confinement comprises (a) a void adapted to confine a plasma, wherein the void comprises at least two faces; (b) at least two planar shaping coils, wherein a first of the at least two planar shaping coils is proximal to a first of the at least two faces but does not encircle the void, and wherein a second of the at least two planar shaping coils is proximal to a second of the at least two faces but does not encircle the void; and (c) a plurality of planar encircling coils, wherein each individual planar encircling coil of the plurality of encircling coils encircles the plasma axis.

In some embodiments, the stellarator optimized for fast particle confinement comprises (a) a plurality of structural supports; (b) one or more field shaping units operably connected to the plurality of structural supports, each field shaping unit comprising one or more planar, surface-mounted shaping coils; and (c) a plurality of planar encircling coils; wherein the plurality of structural supports, the one or more field shaping units, and the plurality of encircling coils collectively define a void adapted for confining plasma therein.

A second aspect of the present disclosure is a system for generating neutrons comprising: (i) a casing defining a first volume; (ii) a blanket defining a second volume; (iii) a stellarator optimized for fast particle confinement, wherein the stellarator is adapted to confine a plasma within the first volume, and wherein the blanket is positioned between the stellarator and the casing; (iv) at least a first negative ion-based neutral beam injector for introducing a first beam of high energy neutral atoms into the plasma in a first angular direction; (v) optionally at least a second negative ion-based neutral beam injector for introducing second beam of high energy neutral atoms into the plasma in a second angular direction; and (vi) an electron heater adapted to heat electrons in the plasma.

In some embodiments, the system comprises at least 2 first negative ion-based neutral beam injectors for introducing the high energy neutral atoms into the plasma in the first angular direction. In some embodiments, the system comprises at least 4 first negative ion-based neutral beam injectors for introducing the high energy neutral atoms into the plasma in the first angular direction. In some embodiments, the system comprises at least 6 first negative ion-based neutral beam injectors for introducing the high energy neutral atoms into the plasma in the first angular direction.

In some embodiments, the system comprises at least one second negative ion-based neutral beam injector for introducing the high energy neutral atoms into the plasma in the second angular direction. In some embodiments, the first and second angular directions are opposite angular directions.

In some embodiments, the system comprises at least two second negative ion-based neutral beam injectors for introducing the high energy neutral atoms into the plasma in the second angular direction. In some embodiments, the first and second angular directions are opposite angular directions.

In some embodiments, the system further comprises at least one material transfer system. In some embodiments, a first of the at least one material transfer system is in communication with the first volume. In some embodiments, the first of the at least one material transfer system is communicatively coupled to a material isolation system. In some embodiments, a second of the at least one material transfer system is in communication with the second volume. In some embodiments, the second of the at least one material transfer system is communicatively coupled to a material isolation system. In some embodiments, the second of the at least one material transfer system is adapted for introducing a flowable target into the second volume. In some embodiments, the second of the at least one material transfer system is adapted for introducing a solid target into the second volume.

In some embodiments, the electron heater is communicatively coupled to a controller.

In some embodiments, the stellarator optimized for fast particle confinement is a quasi-axisymmetric stellarator. In some embodiments, the stellarator optimized for fast particle confinement is a quasi-symmetric stellarator. In some embodiments, the stellarator optimized for fast particle confinement is a quasi-isodynamic stellarator. In some embodiments, the stellarator optimized for fast particle confinement is quasi-omnigenous stellarator.

In some embodiments, the stellarator optimized for fast particle confinement comprises (a) a plurality of planar shaping coils, wherein an array comprising the plurality of planar shaping coils encircles the plasma axis, but where any individual planar shaping coil of the plurality of planar shaping coils does not encircle the plasma axis; and (b) a plurality of planar encircling coils, wherein each individual planar encircling coil of the plurality of encircling coils encircles the plasma axis.

In some embodiments, the stellarator optimized for fast particle confinement comprises (a) a field-shaping coil system including one or more field shaping units which define a void adapted to confine a plasma, wherein each field shaping unit comprises (i) one or more structural mounting elements; and (ii) one or more shaping coils disposed on a surface of the one or more structural mounting elements; and (b) a plurality of encircling coils which encircle the plasma and the field-shaping coil system, wherein the one or more shaping coils and the plurality of encircling coils are comprised of one or more superconducting materials.

In some embodiments, the stellarator optimized for fast particle confinement comprises (a) a void adapted to confine a plasma having a plasma axis; (b) a plurality of planar shaping coils, wherein an array comprising the plurality of planar shaping coils encircles the plasma axis, but where any individual planar shaping coil of the plurality of planar shaping coils does not encircle the plasma axis; and (c) a plurality of planar encircling coils, wherein each individual planar encircling coil of the plurality of encircling coils encircles the plasma axis.

In some embodiments, the stellarator optimized for fast particle confinement comprises (a) a void adapted to confine a plasma, wherein the void comprises at least two faces; (b) at least two planar shaping coils, wherein a first of the at least two planar shaping coils is proximal to a first of the at least two faces but does not encircle the void, and wherein a second of the at least two planar shaping coils is proximal to a second of the at least two faces but does not encircle the void; and (c) a plurality of planar encircling coils, wherein each individual planar encircling coil of the plurality of encircling coils encircles the plasma axis.

In some embodiments, the stellarator optimized for fast particle confinement comprises (a) a plurality of structural supports; (b) one or more field shaping units operably connected to the plurality of structural supports, each field shaping unit comprising one or more planar, surface-mounted shaping coils; and (c) a plurality of planar encircling coils; wherein the plurality of structural supports, the one or more field shaping units, and the plurality of encircling coils collectively define a void adapted for confining plasma therein.

A third aspect of the present disclosure is a method for generating neutrons, comprising: generating a negative ion neutral beam, such as to accelerate neutral atoms to an energy at which the D-D cross section is significant; and injecting the generated negative ion neutral beam into a stellarator optimized for fast particle confinement and controlling the electron temperature so that the beam-slowing down time is long enough for the fast ions to generate neutrons at a desired flux. In some embodiments, the method further comprises forming tritium by bombarding deuterium using the generated neutrons. In some embodiments, the method further comprises capturing and filtering plasma from the stellarator to isolate any tritium that has been formed. In some embodiments, the stellarator optimized for fast particle confinement is a quasi-isodynamic stellarator. In some embodiments, the stellarator optimized for fast particle confinement is quasi-omnigenous stellarator.

In some embodiments, the stellarator optimized for fast particle confinement comprises (a) a field-shaping coil system including one or more field shaping units which define a void adapted to confine a plasma, wherein each field shaping unit comprises (i) one or more structural mounting elements; and (ii) one or more shaping coils disposed on a surface of the one or more structural mounting elements; and (b) a plurality of encircling coils which encircle the plasma and the field-shaping coil system, wherein the one or more shaping coils and the plurality of encircling coils are comprised of one or more superconducting materials.

In some embodiments, the stellarator optimized for fast particle confinement comprises (a) a void adapted to confine a plasma having a plasma axis; (b) a plurality of planar shaping coils, wherein an array comprising the plurality of planar shaping coils encircles the plasma axis, but where any individual planar shaping coil of the plurality of planar shaping coils does not encircle the plasma axis; and (c) a plurality of planar encircling coils, wherein each individual planar encircling coil of the plurality of encircling coils encircles the plasma axis.

In some embodiments, the stellarator optimized for fast particle confinement comprises (a) a void adapted to confine a plasma, wherein the void comprises at least two faces; (b) at least two planar shaping coils, wherein a first of the at least two planar shaping coils is proximal to a first of the at least two faces but does not encircle the void, and wherein a second of the at least two planar shaping coils is proximal to a second of the at least two faces but does not encircle the void; and (c) a plurality of planar encircling coils, wherein each individual planar encircling coil of the plurality of encircling coils encircles the plasma axis.

In some embodiments, the stellarator optimized for fast particle confinement comprises (a) a plurality of structural supports; (b) one or more field shaping units operably connected to the plurality of structural supports, each field shaping unit comprising one or more planar, surface-mounted shaping coils; and (c) a plurality of planar encircling coils; wherein the plurality of structural supports, the one or more field shaping units, and the plurality of encircling coils collectively define a void adapted for confining plasma therein.

BRIEF DESCRIPTION OF THE FIGURES

For a general understanding of the features of the disclosure, reference is made to the drawings. In the drawings, like reference numerals have been used throughout to identify identical elements.

FIG. 4B illustrates a plurality of planar encircling coils encircling the field-shaping coil system and hence the plasma.

DETAILED DESCRIPTION

Figure 1:
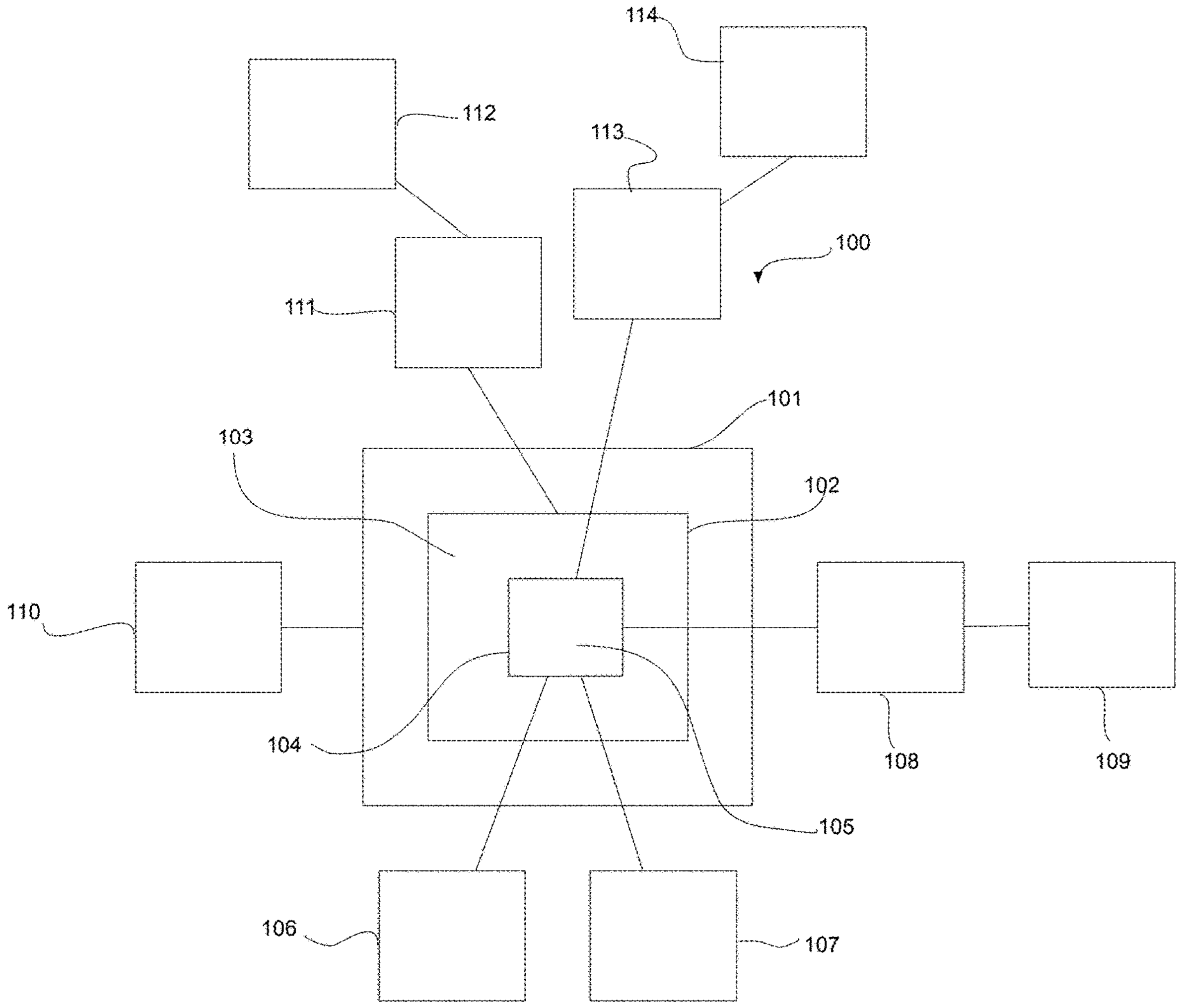
FIG. 1 illustrates a block diagram of a system for generating neutrons in accordance with one embodiment of the present disclosure.

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms “a,” “an,” and “the” include plural referents unless context clearly indicates otherwise. Similarly, the word “or” is intended to include “and” unless the context clearly indicates otherwise. The term “includes” is defined inclusively, such that “includes A or B” means including A, B, or A and B.

As used herein in the specification and in the claims, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of or “exactly one of,” or, when used in the claims, “consisting of,” will refer to the inclusion of exactly one element of a number or list of elements. In general, the term “or” as used herein shall only be interpreted as indicating exclusive alternatives (i.e., “one or the other but not both”) when preceded by terms of exclusivity, such as “either,” “one of,” “only one of” or “exactly one of.” “Consisting essentially of,” when used in the claims, shall have its ordinary meaning as used in the field of patent law.

The terms “comprising,” “including,” “having,” and the like are used interchangeably and have the same meaning. Similarly, “comprises,” “includes,” “has,” and the like are used interchangeably and have the same meaning. Specifically, each of the terms is defined consistent with the common United States patent law definition of “comprising” and is therefore interpreted to be an open term meaning “at least the following,” and is also interpreted not to exclude additional features, limitations, aspects, etc. Thus, for example, “a device having components a, b, and c” means that the device includes at least components a, b, and c. Similarly, the phrase: “a method involving steps a, b, and c” means that the method includes at least steps a, b, and c. Moreover, while the steps and processes may be outlined herein in a particular order, the skilled artisan will recognize that the ordering steps and processes may vary.

As used herein in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified. Thus, as a non-limiting example, “at least one of A and B” (or, equivalently, “at least one of A or B,” or, equivalently “at least one of A and/or B”) can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Reference throughout this specification to “one embodiment” or “an embodiment” means that a particular feature, structure, or characteristic described in connection with the embodiment is included in at least one embodiment. Thus, the appearances of the phrases “in one embodiment” or “in an embodiment” in various places throughout this specification are not necessarily all referring to the same embodiment. Furthermore, the particular features, structures, or characteristics may be combined in any suitable manner in one or more embodiments.

The present disclosure is directed to systems for generating neutrons, the systems including a stellarator optimized for fast particle finement. The present disclosure is also directed to methods of generating neutrons using the systems of the present disclosure and, in particular, systems incorporating a stellarator optimized for fast particle confinement.

Systems

FIG. 1 provides an overview of the systems 100 of the present disclosure. In some embodiments, the system 100 includes a casing 104 defining a first volume 105, a blanket 102 defining a second volume 103 which envelops the casing 104, and a stellarator 101 adapted to confine a plasma within the first volume 105, wherein the stellarator 101 encompasses the blanket 102. The stellarator 101 utilized in the disclosed systems 100 is optimized for past particle confinement. Suitable stellarators 101 that are optimized for past particle confinement are described further herein.

In some embodiments, the system 100 further includes at least a first negative ion-based neutral beam injector 106 for introducing first high energy neutral atoms into the plasma in a first angular direction; optionally at least a second negative ion-based neutral beam injector 107 for introducing second high energy neutral atoms into the plasma in a second angular direction. In some embodiments, the at least the first and the optional at least the second negative ion-based neutral beam injectors 106 and 107, respectively, are in communication, such as fluidic communication, with the first volume 105. In some embodiments, the system 100 includes at least one of the optional second negative ion-based neutral beam injectors.

In some embodiments, the system 100 further includes at least one electron heater 108 adapted to heat electrons in the plasma. In some embodiments, the system 100 includes one electron heater 108. In other embodiments, the system 100 includes two or more electron heaters 108. In some embodiments, the electron heater 108 is in communication with the first volume 105. In some embodiments, the electron heater 108 is communicatively coupled to a controller 109.

In some embodiments, the system further comprises one or more heat transfer systems 110 to regulate the thermal properties of the blanket 101, the second volume 103, and/or the casing 104. In some embodiments, the system 100 further includes a material transfer system 111 to introduce one or more target materials into the second volume 103 and/or to remove synthesized materials from the second volume 103. In some embodiments, the material transfer system 111 is coupled to a material isolation system 112 such that one or more synthesized materials may be isolated from one another and/or such that one or more synthesized materials may be isolated from one or more target materials.

Figure 2A:
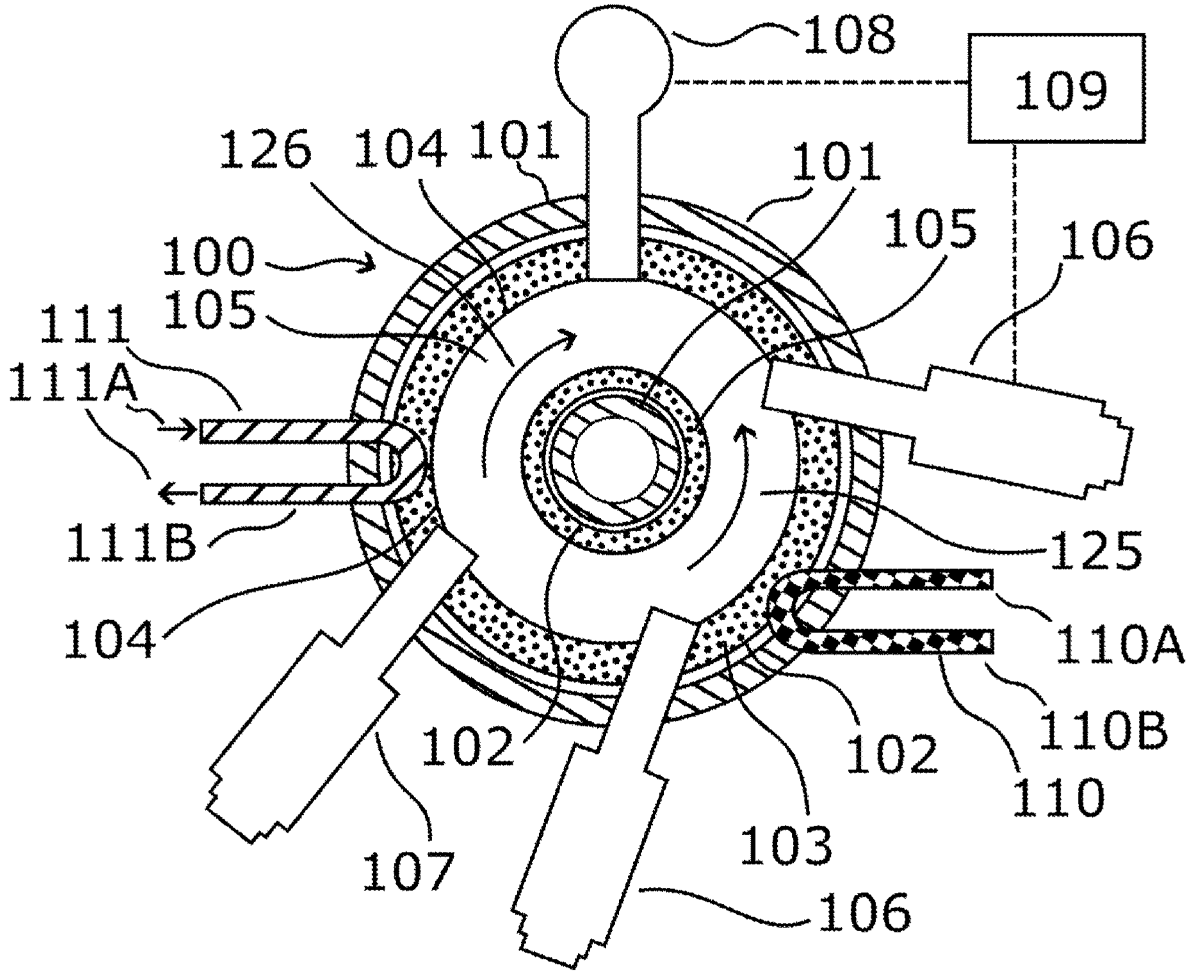
FIG. 2A illustrates a cross-section of a system for generating neutrons in accordance with one embodiment of the present disclosure.
Figure 2B:
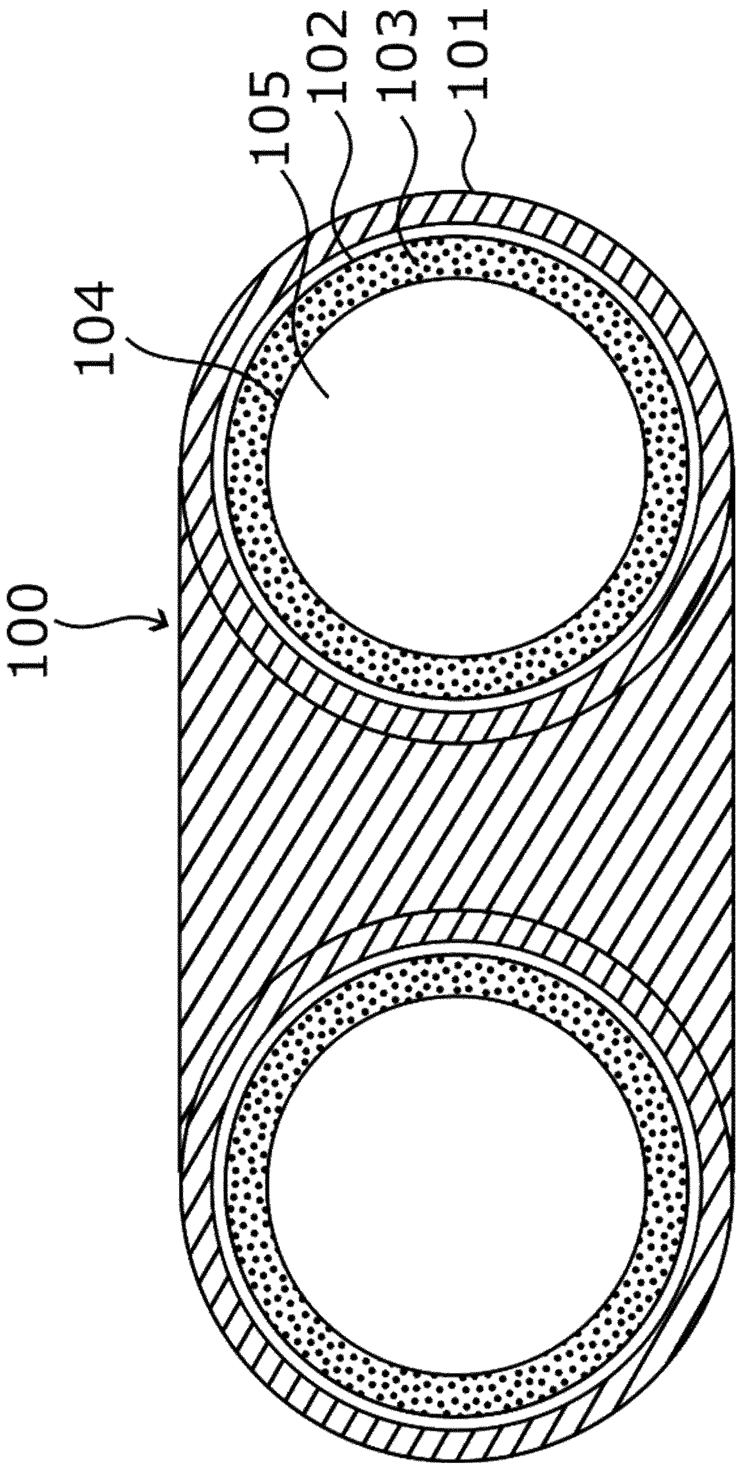
FIG. 2B illustrates a cross-section of a system for generating neutrons in accordance with one embodiment of the present disclosure.

FIGS. 2A and 2B further depict the system 100 of the present disclosure. The systems 100 of the present disclosure incorporates a stellarator 101 optimized for fast particle confinement. In some embodiments, the stellarator 101 optimized for fast particle confinement is configured to confine at least 85%, at least 90%, at least 95%, at least 96%, at least 97%, at least 98%, at least 98.5%, at least 99% of fast particles in a plasma that includes fast particles. Any stellarator 101 may be used as part of the systems of the present disclosure provided that the stellarator is optimized for fast particle confinement. Non-limiting examples of suitable stellarators 101 optimized for fast particle confinement are described further herein.

In accordance with one embodiment of the present disclosure, a stellarator 101 optimized for fast particle confinement is shown in FIGS. 2A and 2B as encompassing a blanket 102, the blanket defining a second volume 103. In some embodiments, the blanket 102 protects the components of the stellarator 101 from the high heat and high energy neutrons produced by fusion reactions within the plasma. As the neutrons are slowed by the blanket 102, their kinetic energy is transformed into heat energy and collected by a heat transfer system 110 in communication with the blanket 102 and/or the second volume 103.

The second volume 103 defined by the blanket 102 envelops a first volume 105 defined by a casing 104. The first volume 105 is adapted to enclose a plasma, wherein the plasma enclosed in the first volume 105 is confined by the stellarator 101. In some embodiments, the plasma is configured to flow in an angular direction 125 (see FIG. 2A). While the angular direction 125 of the plasma within the first volume 105 is depicted in FIG. 2A as counterclockwise, the skilled artisan will appreciate that the angular direction may be clockwise depending on the configuration of the magnetic field introduced onto the plasma by the stellarator 101. In some embodiments, the angular direction may depend on the heating system and/or fueling system incorporated within the disclosed systems.

In some embodiments, the second volume 103 is configured to hold one or more targets comprised of a target material which may be reacted with neutrons to provide a synthesized material. In this regard, the target material is a precursor to the synthesized material. In some embodiments, the one or more targets are solid targets, e.g., ceramic targets. Ceramic target materials may include, for example, metal oxides or metal hydrides. Other target materials include molybdenum (where a material synthesized from the molybdenum target material is, for example, $^{98}$Mo). In other embodiments, the target material is lithium. Other examples of target materials and the material synthesized therefrom include: a target material containing lithium-6 isotope ($^{6}$Li) which produces tritium upon neutron capture; and a target material containing molybdenum-98 ($^{98}$Mo) which produces molybdenum-99 ($^{99}$Mo) upon neutron capture.

In some embodiments, the target material is a precursor for a pharmaceutical radioisotope. In some embodiments, the one or more targets are liquid targets. In some embodiments, the liquid target includes a dispersion or slurry comprising the target material. Examples of such liquid targets include, but are not limited to, molten lithium metal (Li), heavy water ($D_2O$), or a molten salt such as fluorine lithium beryllium (FLiBe). In some embodiments, the one or more targets are in a gas, or are themselves gases.

In some embodiments, the systems of the present disclosure include one or more material transfer systems and/or one or more material isolation systems. In some embodiments, the systems of the present disclosure include two different material transfer systems. In some embodiments, a first material transfer system 111 is in communication with the second volume 103; while a second material transfer system 113 is in communication with the first volume 105. In some embodiments, the system 100 of the present disclosure includes two separate material isolation systems 112 and 114, whereby a first material isolation system 112 is in communication with a first material transfer system 111; and a second material transfer system 113 is in communication with a second material isolation system 114. In other embodiments, the first and second material transfer systems 111 and 113 are in communication with a single material isolation system.

In some embodiments, target materials are introduced into the second volume 103 through one or more material transfer systems 111 in communication with the second volume 103. In some embodiments, each material transfer system 111 includes an inlet 111A (for introducing the target material into the second volume 103) and an outlet 111B (for removing synthesized material and/or remaining target material from the second volume 103). In the case of a liquid target material or a target material dispersed within a liquid, the liquid and/or target material may be flowed into and out of the second volume 103 via the material transfer system 111. In some embodiments, the material transfer system 111 is in communication with a material isolation system 112 adapted to capture and/or separate synthesized material from a target material. In some embodiments, the material isolation system 112 is adapted to capture and/or separate a target material from one or more synthesized materials and/or to separate two different synthesized materials from each other, where the materials were synthesized within the second volume 103. For instance, the material isolation system 112 may be utilized to process materials from the second volume 103 after target material present within the second volume 103 have been bombarded by generated neutrons.

In some embodiments, the material transfer system 113 and the material isolation system 114 are used to introduce, remove, and/or separate at least one isotope of hydrogen (e.g., deuterium or tritium) or helium (e.g., helium-3) from the plasma confined within the first volume 105. For example, if a gas comprising helium-3 has been synthesized within the first volume 105, the helium-3 may be separated from the rest of the plasma and gas within the first volume using the material transfer system 113 and/or material isolation system 114114.

In some embodiments, the system 100 includes one or more negative ion-based neutral beam injectors (see 106 and 107 in FIGS. 2A and 2B). In some embodiments, the one or more negative ion-based neutral beam injectors are configured to introduce high energy neutral atoms into the plasma contained within the first volume 105. In some embodiments, the one or more negative ion-based neutral beam injectors introduce neutral atoms in the same angular direction as the angular direction of flow of the plasma within the first volume 105. In other embodiments, the one or more negative ion-based neutral beam injectors introduce neutral atoms in the opposite angular direction as the angular direction of the flow of the plasma within the first volume 105.

In some embodiments, the system 100 includes one negative ion-based neutral beam injector. In other embodiments, the system 100 includes two negative ion-based neutral beam injectors, where each of the at least two negative ion-based neutral beam injectors may be configured to introduce neutral atoms in any angular direction. In yet other embodiments, the system 100 includes three negative ion-based neutral beam injectors, where each of the at least three negative ion-based neutral beam injectors may be configured to introduce neutral atoms in any angular direction. In further embodiments, the system 100 includes four negative ion-based neutral beam injectors, where each of the at least four negative ion-based neutral beam injectors may be configured to introduce neutral atoms in any angular direction. In yet further embodiments, the system 100 includes five negative ion-based neutral beam injectors, where each of the at least five negative ion-based neutral beam injectors may be configured to introduce neutral atoms in any angular direction. In yet even further embodiments, the system 100 includes six or more negative ion-based neutral beam injectors. In some embodiments, the system 100 includes ten or more negative ion-based neutral beam injectors, where each of the at least ten negative ion-based neutral beam injectors may be configured to introduce neutral atoms in any angular direction. In some embodiments, the system 100 includes twenty or more negative ion-based neutral beam injectors, where each of the at least twenty negative ion-based neutral beam injectors may be configured to introduce neutral atoms in any angular direction.

In some embodiments, the system 100 includes at least two negative ion-based neutral beam injectors wherein a first negative ion-based neutral beam injector 106 introduces neutral atoms in a first angular direction; and wherein a second negative ion-based neutral beam injector 107 introduces neutral atoms in a second angular direction, wherein the first and second angular directions are opposite or substantially opposite each other. In some embodiments, the system 100 includes two or more negative ion-based neutral beam injectors 106, where each of the two or more negative ion-based neutral beam injectors 106 are configured introduce neutral atoms in a first angular direction (such as the same angular direction of the flow of plasma in the first volume 105); and at least negative one ion-based neutral beam injector 107 configured to introduce neutral atoms in a second angular direction, wherein the first and second angular directions are opposite or substantially opposite each other. In some embodiments, the system 100 includes three or more negative ion-based neutral beam injectors 106, where each of the two or more negative ion-based neutral beam injectors 106 are configured introduce neutral atoms in a first angular direction (such as the same angular direction of the flow of plasma in the first volume 105); and at least one negative ion-based neutral beam injector 107 configured to introduce neutral atoms in a second angular direction, wherein the first and second angular directions are opposite or substantially opposite each other.

In some embodiments, the system 100 includes four or more negative ion-based neutral beam injectors 106, where each of the two or more negative ion-based neutral beam injectors 106 are configured introduce neutral atoms in a first angular direction (such as the same angular direction of the flow of plasma in the first volume 105); and at least one negative ion-based neutral beam injector 107 configured to introduce neutral atoms in a second angular direction, wherein the first and second angular directions are opposite or substantially opposite each other (depicted in FIG. 2A). In some embodiments, the system 100 includes four or more negative ion-based neutral beam injectors 106, where each of the two or more negative ion-based neutral beam injectors 106 are configured introduce neutral atoms in a first angular direction (such as the same angular direction of the flow of plasma in the first volume 105); and two or more negative ion-based neutral beam injector 107 configured to introduce neutral atoms in a second angular direction, wherein the first and second angular directions are opposite or substantially opposite each other.

In some embodiments, each of the negative ion-based neutral beam injectors are configured to inject high energy neutral atoms into the plasma, where the neutral atoms have an energy of at least about 100 keV. In other embodiments, each of the negative ion-based neutral beam injectors are configured to inject high energy neutral atoms into the plasma having an energy of at least about 150 keV. In other embodiments, each of the negative ion-based neutral beam injectors are configured to inject high energy neutral atoms into the plasma having an energy of at least about 200 keV. In other embodiments, each of the negative ion-based neutral beam injectors are configured to inject high energy neutral atoms into the plasma having an energy of at least about 250 keV. In yet other embodiments, each of the negative ion-based neutral beam injectors are configured to inject high energy neutral atoms having an energy of at least about 300 keV. In further embodiments, each of the negative ion-based neutral beam injectors are configured to inject high energy neutral atoms into the plasma having an energy of at least about 400 keV. In even further embodiments, each of the negative ion-based neutral beam injectors are configured to inject high energy neutral atoms into the plasma having an energy of at least about 500 keV. In yet further embodiments, each of the negative ion-based neutral beam injectors are configured to inject high energy neutral atoms into the plasma having an energy of at least about 600 keV. In yet even further embodiments, each of the negative ion-based neutral beam injectors are configured to inject high energy neutral atoms into the plasma having an energy of at least about 700 keV. In yet even further embodiments, each of the negative ion-based neutral beam injectors are configured to inject high energy neutral atoms into the plasma having an energy of at least about 800 keV. In yet even further embodiments, each of the negative ion-based neutral beam injectors are configured to inject high energy neutral atoms into the plasma having an energy of at least about 900 keV. In yet even further embodiments, each of the negative ion-based neutral beam injectors are configured to inject high energy neutral atoms into the plasma having an energy of at least about 1000 keV. In yet even further embodiments, each of the negative ion-based neutral beam injectors are configured to inject high energy neutral atoms into the plasma having an energy of at least about 1200 keV. In yet even further embodiments, each of the negative ion-based neutral beam injectors are configured to inject high energy neutral atoms into the plasma having an energy of at least about 1500 keV. In yet even further embodiments, each of the negative ion-based neutral beam injectors are configured to inject high energy neutral atoms into the plasma having an energy of at least about 2000 keV.

Figure 3:
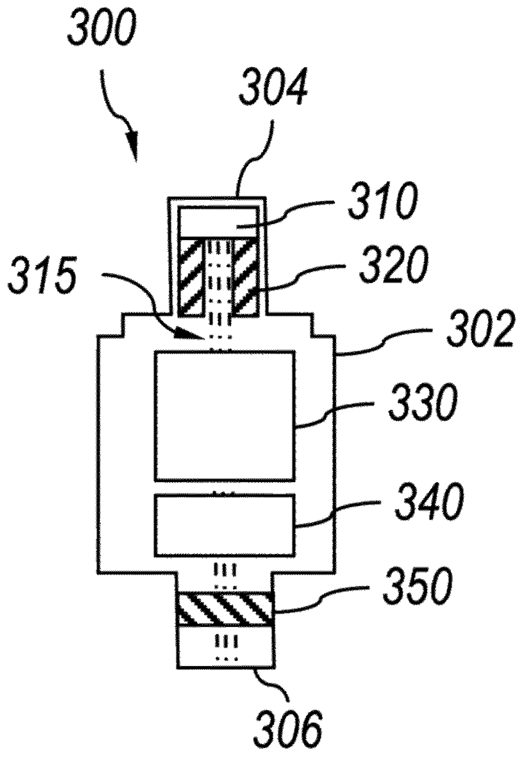
FIG. 3 illustrates a negative ion-based neutral beam injector in accordance with one embodiment of the present disclosure.

Any negative ion-based neutral beam injector may be utilized as part of the presently disclosed systems, provided that the negative ion-based neutral beam injector is capable of injecting high energy neutral atoms into a plasma. An exemplary negative ion-based neutral beam injector is illustrated in FIG. 3. In this particular embodiment, each negative ion-based neutral beam injector 300 may include an external housing 302 having a first end 304 and a second end 306 opposite the first end. The injector 300 may also include an ion source 310, an accelerator 320, and a neutralizer 330. In some embodiments, the negative ion-based neutral beam injector may also include other components, including but not limited to, a residual ion dump 340, and one or more controls 350, such as a valve and/or a shutter. In some embodiments, the ions 315 (such as deuterium ions or tritium ions) are accelerated from the ion source 310 by the accelerator 320 and are passed through the neutralizer 330 where they become neutral atoms (such as deuterium atoms or tritium atoms) before eventually exiting the injector at the second end 306.

Another suitable negative ion-based neutral beam injection is described in PCT Publication No. WO2014039579, the disclosure of which is hereby incorporated by reference herein in its entirety. Another suitable negative ion-based neutral beam injector is the Heating Neutral Beam (HNB) for the ITER experiment, described in Hemsworth et al. (2017) (Hemsworth, R. S., et al. 2017. New Journal of Physics 19 (2): 025005), the disclosure of which is hereby incorporated by reference herein in its entirety.

The system 100 also includes an electron heater 108 configured to regulate the temperature of electrons within the plasma confined within the first volume 105. In some embodiments, the electron heater 108 is an electron cyclotron resonance heater In some embodiments, the electron heater 108 is another neutral beam injector. In some embodiments, the electron heater 108 is a radiofrequency heater operating at a harmonic of the electron cyclotron resonance. In some embodiments, the electron heater 108 ensures that a significantly higher electron temperature is maintained in the plasma as compared with an ion temperature in the plasma by at least a factor of about 2, such as at least a factor of about 2.25, at least a factor of about 2.5, at least a factor of about 2.75, at least a factor of about 3, etc. In some embodiments, the ion temperature may be kept low by ensuring that particle fueling leads to a broad density profile. It is believed that a low ion temperature ensures that the electron density and beam particle density can be higher than otherwise, as they contribute less to the plasma pressure. By way of example, a low ion temperature could be about 2 keV, at which the thermonuclear D-D reaction rate is negligible.

In some embodiments, the electron heater 108 is communicatively coupled to a controller 109. In some embodiments, the controller 109 commands the electron heater 108 to adjust the power it delivers to the plasma. Greater power, for example, about 1 MW, causes the electron temperature of the plasma to become elevated over the temperature that the electrons in the plasma would otherwise be. For example, without power to the electron heater, the electron temperature might be about 10 keV; while with about 1 MW of heating from the electron heater, the electron temperature might be about 13 keV. In some embodiments, the electron heater 108 is commanded by the controller 109 to deliver the amount of power which causes the temperature of the electrons in the plasma to be at the value which causes the highest neutron production rate within the plasma while satisfying all operational constraints. An example of this required electron heating power might be about 1 MW. A plausible range of electron heating powers might be between 0.5 MW and 10 MW, depending on the size of the stellarator, the strength of the magnetic field, and other parameters. An example of this optimal electron temperature might be about 13 keV. A plausible range of optimal electron temperatures might be between 10 keV and 50 keV, depending on the size of the stellarator, the strength of the magnetic field, and other parameters. An example of the neutron rate might be about $2\times10^{17}$ neutrons/second. A plausible range of optimal neutron rates might be between $5\times10^{16}$ neutrons/second and $1\times10^{18}$ neutrons/second, depending on the size of the stellarator, the strength of the magnetic field, and other parameters. An example of an operational constraint might be that the density of high-energy beam-injected deuterium ions be below about $10^{18}$ ions/m$^3$. The neutron production rate increases with electron temperature, but so too does the density of high-energy beam-injected deuterium ions. At some maximum density of high-energy beam-injected deuterium ions, the plasma becomes unstable.

In some embodiments, the system further comprises a heat transfer system 110 to regulate the thermal properties of the stellarator 101. In some embodiments, the heat transfer system 110 includes an inlet 110A such that cool air or a liquid or gaseous coolant may be flowed into a portion of the second volume 103; and an outlet 110B such that warmer air or warmed coolant may be flowed out of the second volume 103 to effectuate removal of excess heat from the second volume 103, the blanket 102, and/or the stellarator 101.

Stellarators

As noted herein, the systems 100 of the present disclosure include a stellarator 101 that is optimized for fast particle confinement. Any stellarator may be utilized having any coil configuration provided that the stellarator is optimized for fast particle confinement.

Figure 4A:
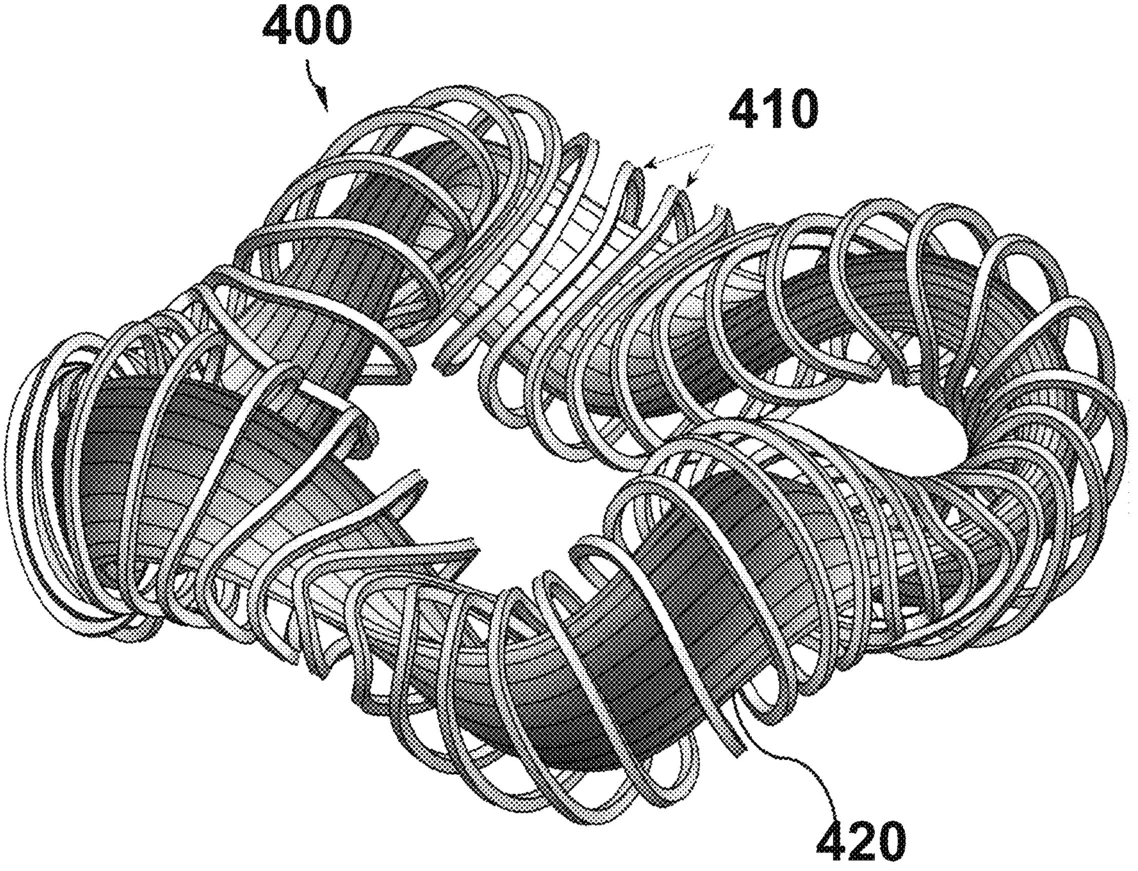
FIG. 4A illustrates a stellarator for use in the systems of the present disclosure in accordance with one embodiment of the present disclosure.

With reference to FIG. 4A, stellarators generally include an array of magnetic coils 410 which function to define a magnetic field that is capable of confining a plasma, such as confining a plasma within the first volume 420 described herein. In some embodiments, stellarators include additional coils external to the magnetic coils; and may further include one or more structural supports.

A stellarator is said to be "optimized" when its magnetic field fulfills a property known as omnigeneity, or quasi-omnigeneity ("QO"). This property and several subcategories are described by Helander (see Helander, Per. 2014. Reports on Progress in Physics 77 (8): 087001, the disclosure of which is hereby incorporated by reference herein in its entirety). Plasma particles on an omnigenous or QO field do not drift across the magnetic field and out of the stellarator. This property is a property of the geometry of the magnetic field that the stellarator produces. Omnigeneity is a rigorous mathematical property—a magnetic field is either omnigenous or not. Because of various considerations including finite engineering tolerance, it is impossible to build a perfectly QO stellarator. Stellarators have been built which are so approximately QO such that the plasma that they confine has been observed to behave substantially in the way that QO plasmas are predicted to behave (see Dinklage, A., et al. 2018. Nature Physics 14 (8): 855-60).

A subset of QO configurations are so-called quasi-symmetric configurations, also described in Helander (2014). Quasi-symmetric stellarators exhibit another specific property of the magnetic field, namely that the amplitude of the magnetic field exhibits a symmetry in a coordinate system which follows the direction of the magnetic field. Again, quasi-symmetry is a rigorous mathematical quantity and it is nearly impossible to construct a stellarator which produces a perfectly quasi-symmetric magnetic field. Stellarators, however, have been built which are so approximately quasi-symmetric that the plasma that they confine has been observed to behave substantially in the way that quasi-symmetric plasmas are predicted to behave (see Canik, J. M., et al. 2007. Physical Review Letters 98 (8): 085002). Quasi-symmetric magnetic fields can be further subdivided into quasi-helically symmetric ("QH") and quasi-axisymmetric ("QA") fields, both rigorously defined in Helander (2014). The quasi-omnigeneity and/or quasi-symmetry of a magnetic configuration can be assessed by someone skilled in the art.

Fast particle confinement refers to the ability of a magnetic field to contain charged particles where a mean gyroradius is not small compared to the scale length of the magnetic field amplitude. An example of a fast particle is a about 1 MeV deuterium ion in a stellarator whose magnetic field is about 6 Tesla (gyroradius about 2 cm) and whose magnetic field amplitude scale length is about 20 cm. QO, QH, and QA stellarators could all be said to be "optimized for fast particle confinement," though QH and QA are thought to be superior in this respect (see Landreman, Matt, and Elizabeth Paul. 2022. Physical Review Letters 128 (3): 035001). Landreman and Paul (2022) describe several more designs for QH and QA stellarators.

In some embodiments, the stellarator 101 optimized for fast particle confinement is quasi-omnigenous stellarator. An example of a suitable quasi-omnigenous stellarator Wendelstein 7-X ("W7-X") described by Dinklage et al. (2018).

In some embodiments, the stellarator 101 optimized for fast particle confinement is a quasi-axisymmetric stellarator. No QA stellarator has been built, but one device which was designed and modeled was the National Compact Stellarator Experiment ("NCSX") described in Williamson et al. (2005) (see Williamson, D., et al. 2005. Fusion Engineering and Design, Proceedings of the 23rd Symposium of Fusion Technology, 75-79 (November): 71-74).

In some embodiments, the stellarator 101 optimized for fast particle confinement is a quasi-symmetric stellarator or a quasi-helically symmetric. An example of a quasi-helically symmetric stellarator is the Helically Symmetric Experiment ("HSX") described in Canik et al. (2007).

In some embodiments, the stellarator 101 optimized for fast particle confinement is a quasi-isodynamic stellarator.

Stellarators Including One or More Encircling Coils and One or More Shaping Cols In some embodiments, a suitable stellarator 101 comprises: (a) a field-shaping coil system including one or more field shaping units which define a void adapted to confine a plasma, wherein each field shaping unit comprises (i) one or more structural mounting elements; and (ii) one or more planar shaping coils disposed on a surface of the one or more structural mounting elements; and (b) a plurality of planar encircling coils which encircle the field-shaping coil system.

In other embodiments, a suitable stellarator 101 comprises: (a) a field-shaping coil system including one or more field shaping units which define a void adapted to confine a plasma, wherein each field shaping unit comprises (i) one or more structural mounting elements; and (ii) one or more shaping coils disposed on a surface of the one or more structural mounting elements; and (b) a plurality of encircling coils which encircle the plasma and the field-shaping coil system, wherein the one or more shaping coils and the plurality of encircling coils are comprised of one or more superconducting materials.

In yet other embodiments, a suitable stellarator 101 comprises: (a) a void adapted to confine a plasma having a plasma axis; (b) a plurality of planar shaping coils, wherein an array comprising the plurality of planar shaping coils encircles the plasma axis, but where any individual planar shaping coil of the plurality of planar shaping coils does not encircle the plasma axis; and (c) a plurality of planar encircling coils, wherein each individual planar encircling coil of the plurality of encircling coils encircles the plasma axis.

In yet further embodiments, a suitable stellarator 101 comprises: (a) a void adapted to confine a plasma, wherein the void comprises at least two faces; (b) at least two planar shaping coils, wherein a first of the at least two planar shaping coils is proximal to a first of the at least two faces but does not encircle the void, and wherein a second of the at least two planar shaping coils is proximal to a second of the at least two faces but does not encircle the void; and (c) a plurality of planar encircling coils, wherein each individual planar encircling coil of the plurality of encircling coils encircles the plasma axis.

In even further embodiments, a suitable stellarator 101 comprises: (a) a plurality of structural supports; (b) one or more field shaping units operably connected to the plurality of structural supports, each field shaping unit comprising one or more planar, surface-mounted shaping coils; and (c) a plurality of planar encircling coils; wherein the plurality of structural supports, the one or more field shaping units, and the plurality of encircling coils collectively define a void adapted for confining plasma therein.

Figure 4B:
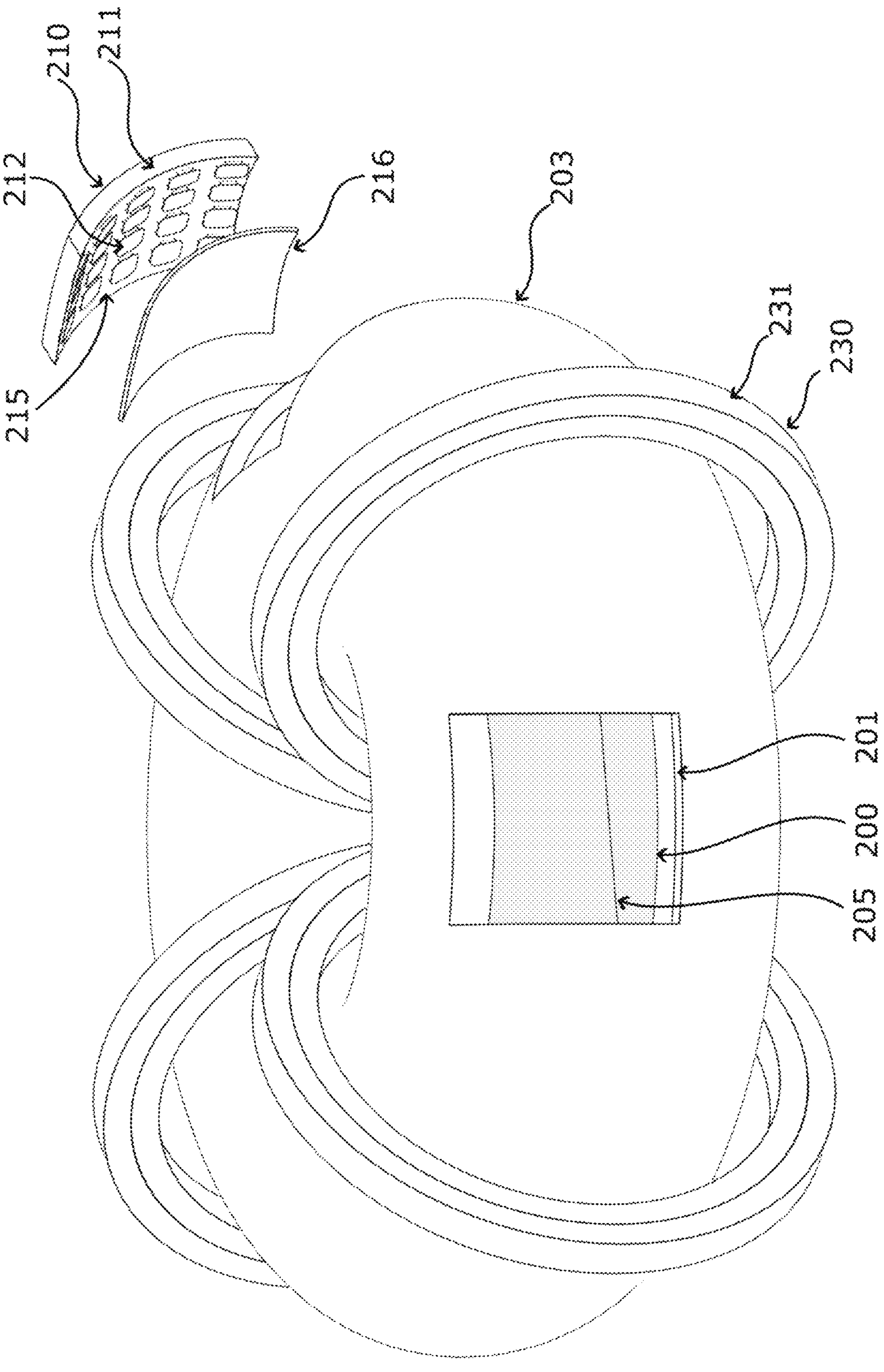
FIG. 4B illustrates a stellarator for use in the systems of the present disclosure in accordance with some embodiments of the present disclosure. In particular.
Figure 4C:
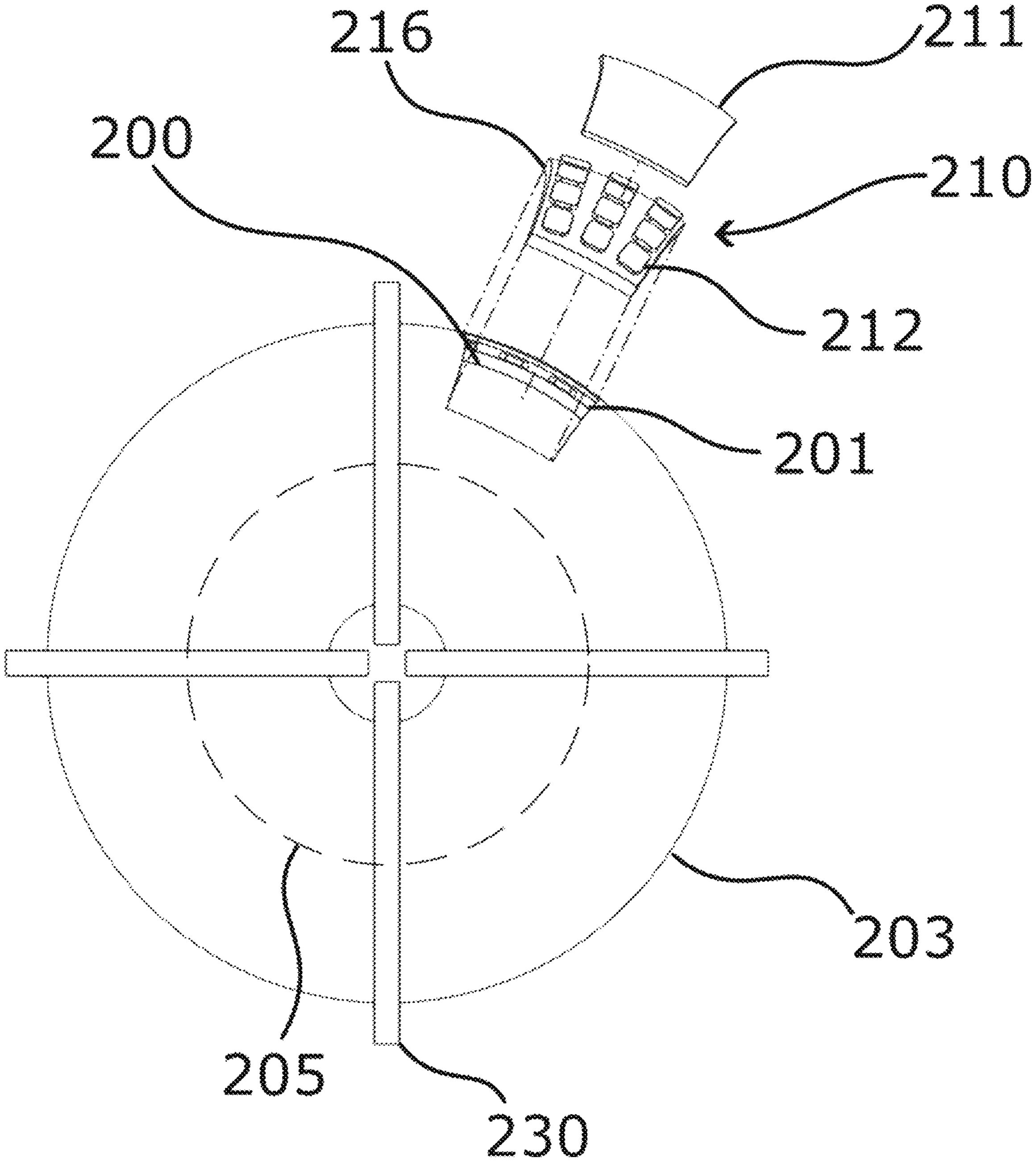
FIG. 4C illustrates a top-down view of a stellarator for use in the systems of the present disclosure in accordance with some embodiments of the present disclosure.
Figure 4D:
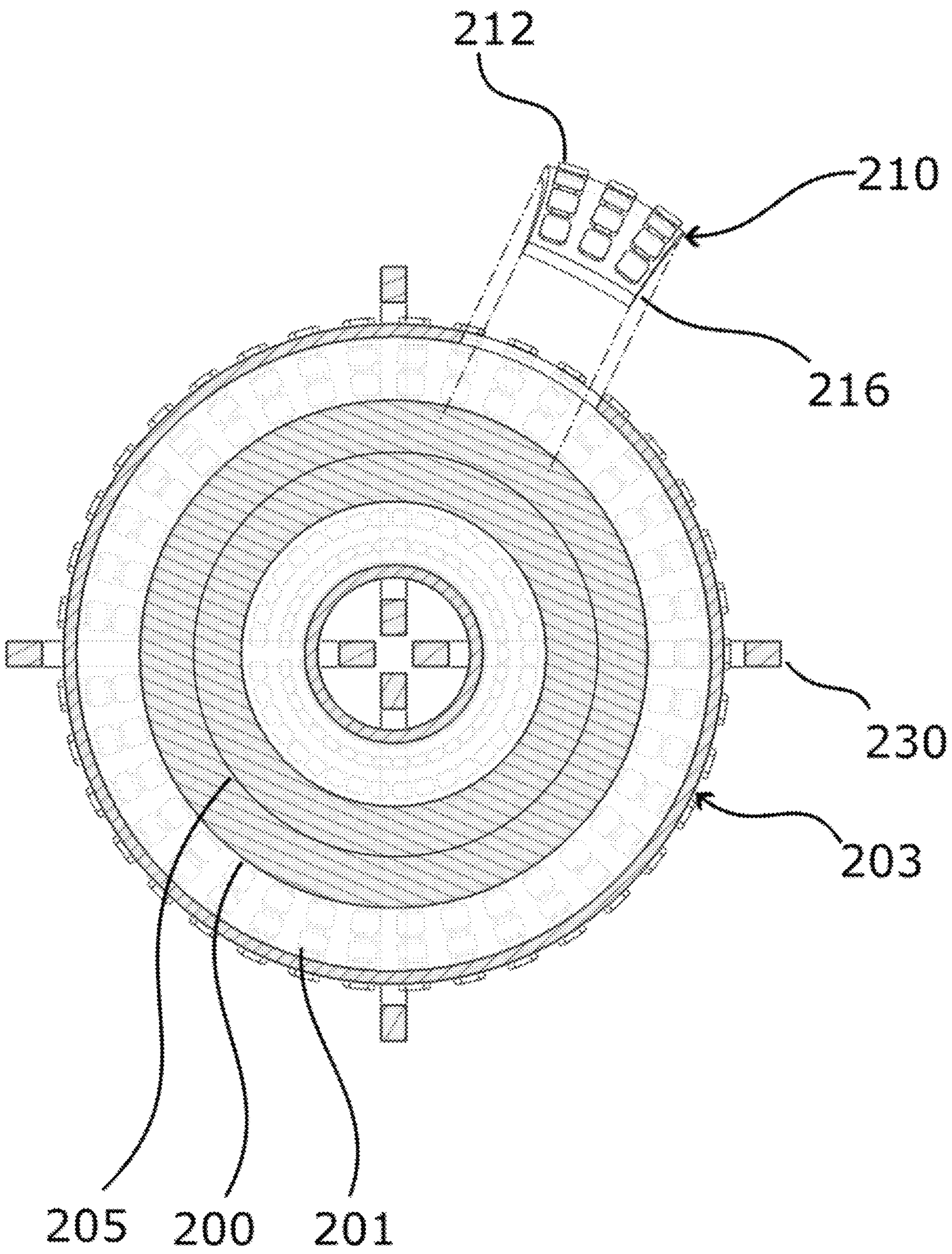
FIG. 4D illustrates a cross sectional view of a stellarator for use in the systems of the present disclosure in accordance with some embodiments of the present disclosure.

In some embodiments, and with reference to FIGS. 4B-4D, stellarators 101 for use in the systems of the present disclosure comprise a field shaping system 203 which surrounds a void 201 that confines a plasma 200. In some embodiments, the void 201 is configured such that a largest dimension from a plasma axis 205 of any contained plasma 200 to an outer edge of the contained plasma (not shown) is less than 20 meters, such as less than 10 meters, such as less than 5 meters, such as less than 4 meters, such as less than 3 meters, such as less than 2 meters, such as less than 1 meter, such as less than 0.5 meters, etc.

In some embodiments, the plasma 200 has a topology which substantially approximates that of a torus. In some embodiments, the plasma 200 is centered around a "plasma axis" 205, which is a magnetic field line that maps onto its own origin after one toroidal rotation. In some embodiments, the plasma axis 205 has a topology of a loop or one that substantially approximates a loop.

The field shaping system 203 comprises a plurality of field shaping units 210. In some embodiments, the field shaping system 203 may comprise at least 2, at least 4, at least 6, at least 8, at least 10, at least 12, at least 16, at least 20, at least 24, at least 30, at least 36, at least 48, at least 54, at least 60, at least 70, at least 80, at least 90, at least 100, at least 110, at least 120, at least 130, at least 150, at least 170 field shaping units 210. Each of the field shaping units 210 includes one or more structural mounting elements 211 having a surface 215. In some embodiments, the surface 215 of each field shaping unit 211 faces the the void 201. In some embodiments, each field shaping unit 210 further includes one or more additional components 216. The one or more additional components include, but are not limited to, a first wall to handle plasma flux, a structure which mounts to the first wall, a breeding blanket to breed radioisotopes from the fusion neutron flux, a cryostat, and/or neutron shielding.

In some embodiments, each field shaping unit 210 comprises a single structural mounting element 211. In other embodiments, each field shaping unit 210 comprises two structural mounting elements 211. In yet other embodiments, each field shaping unit 210 comprises three structural mounting elements 211. In further embodiments, each field shaping unit 210 comprises four or more structural mounting elements 211. In some embodiments, the structural mounting element 211 is comprised of steel. In some embodiments, the structural mounting element 211 comprises a metal. In some embodiments, the structural mounting element 211 comprises a composite material such as G-10.

The field shaping unit 210 may have any size and shape. In some embodiments, the field shaping unit 210 defines an extruded circular annulus cross section structure. In other embodiments, the field shaping unit 210 has an arbitrary shape, such as a shape having a non-constant crosssection. For example, and as illustrated in FIG. 4C, in some embodiments, the field shaping unit 410 has a wedge shape (as seen from a perspective perpendicular to the plasma axis and the direction of curvature, arranged such that the narrower portion of the wedge faces the direction of plasma axis curvature, and the wider portion of the wedge faces opposite the direction of plasma axis curvature). In some embodiment, the field shaping unit 410 has substantially a wedge shape. In other embodiments, the field shaping unit has a similar or the same cross sectional shape as the plasma at that location. In other embodiments, the field shaing unit has 210 has a shape similar or the same as a cross sectional shape of the plasma, with some constant normal offset distance.

In some embodiments, one or more shaping coils 212 are disposed on the surface 215 of each of the one or more structural mounting elements 211. It is believed that the one or more shaping coils 212 of the present disclosure are relatively easy to manufacture, assemble, and integrate into a field shaping unit. Moreover, it is beleved that the one or more field shaping coils 212 allow precise control over the shape of the plasma.

Each of the one or more shaping coils 212 are planar coils. A "planar" coil is one whose shape substantially lies within one flat plane. In some embodiments, each of the shaping coils 212 individually do not encircle the plasma axis 205. Said another way, any one shaping coil 212 does not encircle the plasma 200 or the plasma axis 205. While any individual shaping coil 212 does not encircle the plasma axis 205, collectively an array including a plurality of shaping coils 212 mounted on the surfaces 215 of one or more structural mounting elements 211 would encircle the plasma axis 205. In some embodiments, individual shaping coils may be positioned on opposite sides of the plasma or on different faces of the void.

Each of the one or more shaping coils 212 do not interlock with any other shaping coil, such as illustrated in at least FIG. 4B. Additionally, each of the one or more shaping coils do not interlock with any of the encircling coils 230 described herein (see FIG. 4B). In some embodiments, the one or more shaping coils 212 are removably coupled to the surface 215 of the one or more surface mounting elements 211.

In some embodiments, the planar shaping coils have a mean coil radius which is smaller than a major radius of the plasma and smaller than a minor radius of the plasma. As used herein, the "major radius" of the plasma is the mean distance between the plasma axis and the geometric center of the stellarator 101. As used herein, the "minor radius" of the plasma is the mean closest distance between each point on the plasma boundary and the plasma axis. The plasma boundary is sometimes represented by a set of toroidal Fourier amplitudes; for this case, the major radius is represented by the amplitude of the mode with toroidal mode number 0 and poloidal mode number 0, and the minor radius is represented by the amplitudes of the mode with toroidal mode number 0 and poloidal mode number 1.

The shaping coils 212 may have different sizes and shapes. In some embodiments the shaping coils may be circular or substantially circular. In other embodiments, the shaping coils may be rectangular or substantially rectangular. In yet other embodiments, the shaping coils may be rectangular with rounded corners or substantially rectangular with rounded corners. In some embodiments, each field shaping unit may comprise one or more coils having different shapes. For instance, a field shaping unit 210 may comprise 10 shaping coils where 3 of the shaping coils may have a substantially circular shape, 4 of the shaping coils may have a substantially rectangular shape, and 3 of the coils may have a substantially rectangular shape with rounded corners (not depicted).

In some embodiments, stellarators 101 for use in the systems of the present disclosure may include between about 10 and 10,000 shaping coils. In other embodiments stellarators 101 for use in the systems of the present disclosure may include between about 50 and 5,000 shaping coils. In yet other embodiments, stellarators 101 for use in the systems of the present disclosure may include between about 100 and 5,000 about shaping coils. In further embodiments, stellarators 101 for use in the systems of the present disclosure may include between about 100 and 4,000 about shaping coils. In yet further embodiments, stellarators 101 for use in the systems of the present disclosure may include between about 100 and 3,000 about shaping coils. In even further embodiments, stellarators 101 for use in the systems of the present disclosure may include between about 100 and 2,000 about shaping coils. In even further embodiments, the stellarator of the present disclosure may include between about 100 and 1,000 about shaping coils.

In some embodiments, a field shaping unit 210 may include between about 5 and about 150 shaping coils 212. In other embodiments, a field shaping unit 210 may include between about 5 and about 100 shaping coils 212. In yet other embodiments, a field shaping unit 210 may include between about 5 and about 80 shaping coils 212. In further embodiments, a field shaping unit 210 may include between about 5 and about 70 shaping coils 212. In even further embodiments, a field shaping unit 211 may include between about 5 and about 60 shaping coils 212. In yet even further embodiments, a field shaping unit 210 may include between about 5 and about 50 shaping coils 212. In yet even further embodiments, a field shaping unit 210 may include between about 5 and about 45 shaping coils 212. In yet even further embodiments, a field shaping unit 210 may include between about 5 and about 40 shaping coils 212. In yet even further embodiments, a field shaping unit 210 may include between about 5 and about 35 shaping coils 212. In yet even further embodiments, a field shaping unit 210 may include between about 5 and about 30 shaping coils 212. In yet even further embodiments, a field shaping unit 211 may include between about 5 and about 25 shaping coils 212.

With reference to FIG. 4B, stellarators 101 for use in the systems of the present disclosure also includes a plurality of encircling coils 230 which encircle the plasma axis 205. Each of the encircling coils 230 are arranged around an exterior of the field shaping system 203 and encircle it. Each encircling coil 230 of the plurality of encircling coils are planar. Moreover, each encircling coil 230 of the plurality of encircling coils are non-interlocking with any other encircling coil 230. Additionally, each encircling coil 230 of the plurality of encircling coils are do not interlock with any of the shaping coils 212. Said another way, any encircling coil 230 does not interlock with any other planar encircling coil 230 or with any other shaping coil 212, such as depicted in FIGS. 4B and 4C. In some embodiments, each encircling coil 230 is supported by a structural component 231. In some embodiments, the structural component 231 and the field shaping units 210 may be coupled to other structural members which react to unbalanced forces and torques.

In some embodiments, the encircling coils do not exhibit the N-fold rotational symmetry of toroidal field (TF) coils. If the encircling coils are N-fold rotationally symmetric, like TF coils in the prior art, then the planar shaping coils require some irreducible quantity of current length (Amperes*meters) in order to correct this field. If the encircling coils are allowed to not be N-fold rotationally symmetric, the current-length requirements of the planar shaping coils can be reduced by a large factor. Our analysis shows that this requirement may be reduced by nearly a factor of 10 by allowing the encircling coils to be positioned more favorably.

In some embodiments, stellarators 101 for use in the systems of the present disclosure include between about 3 and about 150 encircling coils. In other embodiments, stellarators 101 for use in the systems of the present disclosure include between about 3 and about 100 encircling coils. In yet other embodiments, stellarators 101 for use in the systems of the present disclosure include between about 3 and about 75 encircling coils. In further embodiments, stellarators 101 for use in the systems of the present disclosure include between about 3 and about 50 encircling coils. In yet further embodiments, stellarators 101 for use in the systems of the present disclosure include between about 3 and about 25 encircling coils. In even further embodiments, stellarators 101 for use in the systems the present disclosure include between about 3 and about 15 encircling coils. In yet even further embodiments, stellarators 101 for use in the systems of the present disclosure include between about 3 and about 10 encircling coils. In some embodiments, the spacing between each encircling coil may range from between ahout 10 cm to about 1 m.

The shaping coils 212 and the encircling coils 230 may be comprised of one or more superconducting materials. A superconductor is a material that achieves superconductivity. Superconductivity is the property of certain materials to conduct direct current (DC) electricity without energy loss when they are cooled below a critical temperature (referred to as $T_c$). An electric current in a superconductor can persist indefinitely. Exemplary superconducting materials include, but are not limited to, Nb—Ti, $Nb_3Sn$, $MgB_2$, $LaBaCuO_x$, LSCO (e.g., $La_{2-x}Sr_xCuO_4$, etc.), YBCO (e.g., $YBa_2Cu_3O_7$ or $YBa_2Cu_3O_7$), REBCO, bismuth-based cuprate superconductors (BSCCO) (including $Bi_2Sr_2CaCu_2O_8$ (Bi-2212) and $Bi_2Sr_2Ca_2Cu_3O_{10}$ (Bi-2223), TBCCO (e.g., $Tl_2Ba_2Ca_2Cu_3O_{10}$ or $Tl_mBa_2Ca_3CuO_{2+m+2+\delta}$), $HgBa_2Ca_2Cu_3O_x$, and other mixed-valence copper-oxide perovskite materials. In some embodiments, the shaping coils and the encircling coils may be comprised on the same materials. In other embodiments, the shaping coils and the encircling coils may be comprised on different materials.

In some embodiments, stellarators 101 for use in the systems of the present disclosure further include one or more additional coils, such as one or more control coils and/or one or more saddle coils. In some embodiments, the control coils and/or the saddles are planar. In some embodiments, the control coils and/or the saddles are non-planar. In some embodiments, the control coils and/or the saddles are superconducting. In some embodiments, the control coils and/or the saddles are non-interlocking and, in particular, they do not interlock any other of the disclosed coils (e.g., encircling coils, shaping coils) or the plasma axis. In some embodiments, the control coils and/or the saddle coils are disposed between the plasma boundary and the field shaping system. In some embodiments, the control coils and/or the saddle coils are disposed outward of the field shaping system, on the non-plasma-axis-facing side. Control coils are coils included as a contingency against unexpected sources of error. These errors may arise from errors in assembly of the magnet system, or from unexpected plasma physics. Before the error is measured, the correct electrical current for the control coils is not known. During normal operation of the stellarator 101, if the stellarator 101 and plasma are operating at their design points, the control currents have zero electric current. The design of the stellarator magnetic field does not include contributions from the control coils.

Methods

The present disclosure is also directed to methods of generating neutrons and/or synthesizing one or more materials using the systems 100 of the present disclosure and, in particular, systems incorporating a stellarator 101 optimized for fast particle confinement.

Figure 5:
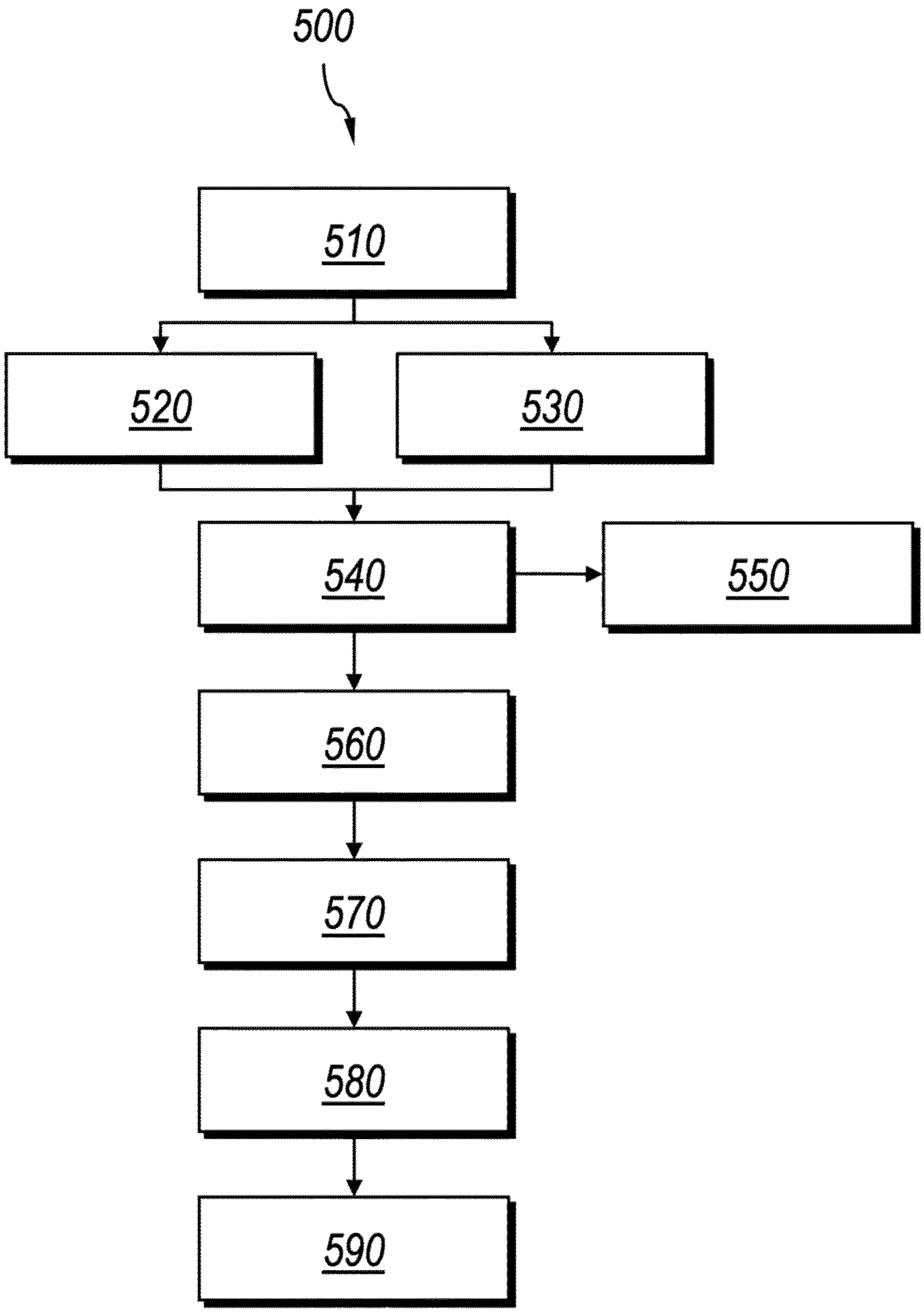
FIG. 5 provides a flowchart of a method for generating neutrons in accordance with some embodiments of the present disclosure.
Figure 6A:
FIGS. 6A-6C are simplified illustrations of different wiring configurations for planar shaping coils.
Figure 6B:
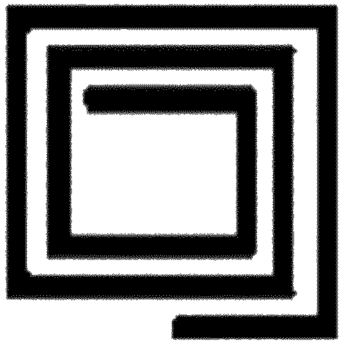
Figure 6C:
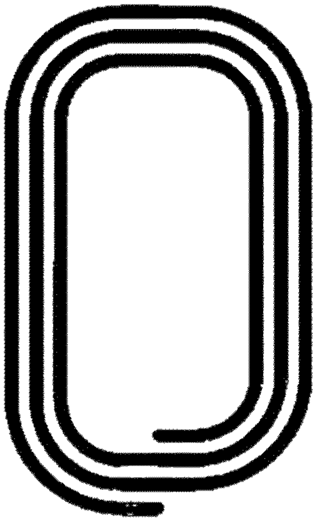

With reference to FIG. 5, the method 500 may include generating 510 a negative ion-based neutral beam (such as with one or more negative ion-based neutral beam injectors) to accelerate ions (such as deuterium ions) to energies at which the ion-ion fusion cross-section (which, in the context of deuterium ions, is an energy at which the D-D cross section is significant) is high, such as 100 millibarns or higher.

In some embodiments, the method 500 may include injecting 520 the negative ion-based neutral beam into a stellarator 101 optimized for fast particle confinement (such as using the one or more negative ion-based neutral beam injectors 106). In some embodiments, the stellarator 101 optimized for fast particle confinement is a quasi-axisymmetric stellarator. In some embodiments, the stellarator 101 optimized for fast particle confinement is a quasi-symmetric stellarator. In some embodiments, the stellarator 101 optimized for fast particle confinement is a quasi-isodynamic stellarator. In some embodiments, the stellarator 101 optimized for fast particle confinement is quasi-omnigenous stellarator. In some embodiments, the stellarator 101 optimized for fast particle confinement comprises (a) a plurality of planar shaping coils, wherein an array comprising the plurality of planar shaping coils encircles the plasma axis, but where any individual planar shaping coil of the plurality of planar shaping coils does not encircle the plasma axis; and (b) a plurality of planar encircling coils, wherein each individual planar encircling coil of the plurality of encircling coils encircles the plasma axis. In some embodiments, the stellarator 101 optimized for fast particle confinement comprises (a) a field-shaping coil system including one or more field shaping units which define a void adapted to confine a plasma, wherein each field shaping unit comprises (i) one or more structural mounting elements; and (ii) one or more shaping coils disposed on a surface of the one or more structural mounting elements; and (b) a plurality of encircling coils which encircle the plasma and the field-shaping coil system, wherein the one or more shaping coils and the plurality of encircling coils are comprised of one or more superconducting materials. In some embodiments, the stellarator 101 optimized for fast particle confinement comprises (a) a void adapted to confine a plasma having a plasma axis; (b) a plurality of planar shaping coils, wherein an array comprising the plurality of planar shaping coils encircles the plasma axis, but where any individual planar shaping coil of the plurality of planar shaping coils does not encircle the plasma axis; and (c) a plurality of planar encircling coils, wherein each individual planar encircling coil of the plurality of encircling coils encircles the plasma axis. In some embodiments, the stellarator 101 optimized for fast particle confinement comprises (a) a void adapted to confine a plasma, wherein the void comprises at least two faces; (b) at least two planar shaping coils, wherein a first of the at least two planar shaping coils is proximal to a first of the at least two faces but does not encircle the void, and wherein a second of the at least two planar shaping coils is proximal to a second of the at least two faces but does not encircle the void; and (c) a plurality of planar encircling coils, wherein each individual planar encircling coil of the plurality of encircling coils encircles the plasma axis. In some embodiments, the stellarator 101 optimized for fast particle confinement comprises (a) a plurality of structural supports; (b) one or more field shaping units operably connected to the plurality of structural supports, each field shaping unit comprising one or more planar, surface-mounted shaping coils; and (c) a plurality of planar encircling coils; wherein the plurality of structural supports, the one or more field shaping units, and the plurality of encircling coils collectively define a void adapted for confining plasma therein.

In some embodiments, the method 500 may include injecting 520 the negative-ion-based neutral beam into a stellarator 101 optimized for fast particle confinement (including any of those described above) and controlling 530 the electron temperature so that the neutron flux is at its maximum value while still satisfying operational constraints (such as with an electron heater 108). Operational constraints include the maximum injected power (e.g., about 2 MW) and the maximum fast particle density (e.g., about $10^{18}$ ions/$m^3$) to maintain stability.

The method may also include, within the plasma of the stellarator and/or in the blanket 102, forming 540 tritium by bombarding deuterium using the generated neutrons. The method may include capturing 550 and filtering/processing plasma from the stellarator to isolate any tritium that has been formed (such as using any one of the material transfer and/or isolation systems described herein). The method may also include allowing 560 the generated neutrons to enter a volume, such as a second volume 103. The method may also include cooling 570 the internal volume of space.

The method may also include forming 580 a modified material by allowing the neutrons to bombard a target material located outside the first volume and within an internal volume of space, such as a second volume 103. The target material should be a precursor for the desired synthesized material. In some embodiments, the target material is a ceramic. In some embodiments, the target material is molybdenum and the synthesized material is an isotope of molybdenum. In some embodiments, the isotope of molybdenum is $^{98}$Mo. In some embodiments, the target material is hydrogen, helium, or deuterium. In some embodiments, the target material is a precursor of a pharmaceutical drug. The method may also include removing 590 the modified material from the internal volume of space.

Additional Embodiments

A first additional embodiment is a system for generating neutrons comprising: (i) a casing defining a first volume; (ii) a blanket defining a second volume; (iii) a stellarator is adapted to confine a plasma within the first volume, and wherein the blanket is positioned between the stellarator and the casing; (iv) at least a first negative ion-based neutral beam injector for introducing first high energy neutral atoms into the plasma in a first angular direction; (v) optionally at least a second negative ion-based neutral beam injector for introducing second high energy neutral atoms into the plasma in a second angular direction; and (vi) an electron heater adapted to heat electrons in the plasma; wherein the stellarator comprises (a) a field-shaping coil system including one or more field shaping units, wherein each field shaping unit comprises (i) one or more structural mounting elements; and (ii) one or more planar shaping coils disposed on a surface of the one or more structural mounting elements; and (b) a plurality of planar encircling coils which encircle the field-shaping coil system. Since the field-shaping coil system defines a void which confines the plasma, and since the planar encircling coils encircle the field-shaping coil system, the planar encircling coils therefore encircle the plasma confined within the void. In some embodiments, the stellarator does not include any non-planar coils.

In some embodiments, the system comprises at least 2 first negative ion-based neutral beam injectors for introducing the high energy neutral atoms into the plasma in the first angular direction. In some embodiments, the system comprises at least 4 first negative ion-based neutral beam injectors for introducing the high energy neutral atoms into the plasma in the first angular direction. In some embodiments, the system comprises at least 6 first negative ion-based neutral beam injectors for introducing the high energy neutral atoms into the plasma in the first angular direction.

In some embodiments, the system comprises at least one second negative ion-based neutral beam injector for introducing the high energy neutral atoms into the plasma in the second angular direction. In some embodiments, the first and second angular directions are opposite angular directions.

In some embodiments, the system comprises at least two second negative ion-based neutral beam injectors for introducing the high energy neutral atoms into the plasma in the second angular direction. In some embodiments, the first and second angular directions are opposite angular directions.

In some embodiments, the stellarator further comprises one or more controllers. In some embodiments, the stellarator further comprises one or more control coils and/or one or more saddle coils. In some embodiments, the one or more control coils and/or the one or more saddles coils are communicatively coupled to a controller.

In some embodiments, each of the one or more of planar shaping coils are superconducting coils. In some embodiments, each of the plurality of planar encircling coils are superconducting coils. In some embodiments, both the plurality of planar shaping coils and the plurality of planar encircling coils are superconducting coils.

In some embodiments, the stellarator includes between about 3 and about 100 planar encircling coils. In some embodiments, the stellarator comprises at least four planar encircling coils. In some embodiments, the plurality of planar encircling coils are comprised of one or more superconducting materials. In some embodiments, the plurality of planar encircling coils do not interlock with each other. In some embodiments, the plurality of planar encircling coils do not interlock with each other and do not interlock with any of the shaping coils.

In some embodiments, the stellarator comprises at least 4 field shaping units. In some embodiments, each of the one or more field shaping units comprises one structural mounting element. In some embodiments, the one structural mounting element is wedge shaped. In some embodiments, each of the one or more field shaping units comprises two or more structural mounting elements.

In some embodiments, the one or more planar shaping coils do not interlock with each other. In some embodiments, the one or more planar shaping coils do not interlock with each other and do not interlock with any of the planar encircling coils.

In some embodiments, each of the one or more field shaping units comprises between about 5 and about 100 shaping coils. In some embodiments, each of the one or more field shaping units comprises between about 5 and about 50 shaping coils. In some embodiments, the surface of the one or more structural mounting elements faces the void.

In some embodiments, a shape of each planar shaping coil of the one or more planar shaping coils is substantially rectangular, substantially rectangular with rounded corners, or substantially circular.

In some embodiments, the second volume is configured to hold one or more target materials. In some embodiments, the first angular direction is the same as the direction of a flow of the plasma. In some embodiments, the second angular direction is opposite the first angular direction.

In some embodiments, the system further comprises a material transfer system.

In some embodiments, the at least the first and the optional at least the second negative ion-based neutral beam injectors include a source of ions, an accelerator, and a neutralizer.

In some embodiments, the electron heater is an electron cyclotron resonance heating system. In some embodiments, the electron heater is communicatively coupled to a controller. In some embodiments, the controller is adapted to command the electron heater to heat the electrons in the plasma.

In some embodiments, the first and second high energy neutral atoms are deuterium atoms. In some embodiments, the plasma comprises a deuterium plasma.

A second additional embodiment is a system for generating neutrons comprising: (i) a casing defining a first volume; (ii) a blanket defining a second volume; (iii) a stellarator is adapted to confine a plasma within the first volume, and wherein the blanket is positioned between the stellarator and the casing; (iv) at least a first negative ion-based neutral beam injector for introducing first high energy neutral atoms into the plasma in a first angular direction; (v) optionally at least a second negative ion-based neutral beam injector for introducing second high energy neutral atoms into the plasma in a second angular direction; and (vi) an electron heater adapted to heat electrons in the plasma; wherein the stellarator comprises (a) a field-shaping coil system including one or more field shaping, wherein each field shaping unit comprises (i) one or more structural mounting elements; and (ii) one or more shaping coils disposed on a surface of the one or more structural mounting elements; and (b) a plurality of encircling coils which encircle the plasma and the field-shaping coil system, wherein the one or more shaping coils and the plurality of encircling coils are comprised of one or more superconducting materials. In some embodiments, each of the one or more shaping coils disposed on the surface of the one or more structural mounting elements does not encircle the plasma. In some embodiments, the one or more shaping coils are planar. In some embodiments, each encircling coil of the plurality of encircling coils are planar.

In some embodiments, a shape of each of the one or more shaping coils is substantially rectangular, substantially rectangular with rounded corners, or substantially circular. In some embodiments, each of the one or more field shaping units comprises between about 5 and about 100 shaping coils. In some embodiments, each of the one or more field shaping units comprises between about 5 and about 50 shaping coils. In some embodiments, the one or more planar shaping coils do not interlock with each other.

In some embodiments, each of the one or more field shaping units comprises one structural mounting element. In some embodiments, the one structural mounting element is wedge shaped. In some embodiments, each of the one or more field shaping units comprises two or more structural mounting elements.

In some embodiments, the plurality of encircling coils encircle the plasma confined within the void. In some embodiments, the stellarator includes between about 3 and about 100 encircling coils. In some embodiments, the stellarator comprises at least four encircling coils.

In some embodiments, the plurality of encircling coils are comprised of one or more superconducting materials. In some embodiments, the plurality of planar encircling coils do not interlock with each other.

In some embodiments, the stellarator further comprises one or more control coils and/or one or more saddle coils. In some embodiments, the one or more control coils and/or the one or more saddles coils are communicatively coupled to a controller.

In some embodiments, the second volume is configured to hold one or more target materials. In some embodiments, the first angular direction is the same as the direction of a flow of the plasma. In some embodiments, the second angular direction is opposite the first angular direction.

In some embodiments, the system further comprises a material transfer system.

In some embodiments, the at least the first and the optional at least the second negative ion-based neutral beam injectors include a source of ions, an accelerator, and a neutralizer.

In some embodiments, the electron heater is an electron cyclotron resonance heating system. In some embodiments, the electron heater is communicatively coupled to a controller. In some embodiments, the controller is adapted to command the electron heater to heat the electrons in the plasma.

In some embodiments, the first and second high energy neutral atoms are deuterium atoms. In some embodiments, the plasma comprises a deuterium plasma.

In some embodiments, the system comprises at least 2 first negative ion-based neutral beam injectors for introducing the high energy neutral atoms into the plasma in the first angular direction. In some embodiments, the system comprises at least 4 first negative ion-based neutral beam injectors for introducing the high energy neutral atoms into the plasma in the first angular direction. In some embodiments, the system comprises at least 6 first negative ion-based neutral beam injectors for introducing the high energy neutral atoms into the plasma in the first angular direction.

In some embodiments, the system comprises at least one second negative ion-based neutral beam injector for introducing the high energy neutral atoms into the plasma in the second angular direction. In some embodiments, the first and second angular directions are opposite angular directions.

In some embodiments, the system comprises at least two second negative ion-based neutral beam injectors for introducing the high energy neutral atoms into the plasma in the second angular direction. In some embodiments, the first and second angular directions are opposite angular directions.

A third additional embodiment is a system for generating neutrons comprising: (i) a casing defining a first volume; (ii) a blanket defining a second volume; (iii) a stellarator is adapted to confine a plasma within the first volume, and wherein the blanket is positioned between the stellarator and the casing; (iv) at least a first negative ion-based neutral beam injector for introducing first high energy neutral atoms into the plasma in a first angular direction; (v) optionally at least a second negative ion-based neutral beam injector for introducing second high energy neutral atoms into the plasma in a second angular direction; and (vi) an electron heater adapted to heat electrons in the plasma; wherein the stellarator comprises a plurality of planar shaping coils, wherein an array comprising the plurality of planar shaping coils encircles a plasma axis, but where any individual planar shaping coil of the plurality of planar shaping coils does not encircle the plasma axis; and a plurality of planar encircling coils, wherein each individual planar encircling coil of the plurality of encircling coils encircles the plasma axis. In some embodiments, each of the plurality of planar shaping coils are superconducting coils. In some embodiments, each of the plurality of planar encircling coils are superconducting coils. In some embodiments, both the plurality of planar shaping coils and the plurality of planar encircling coils are superconducting coils. In some embodiments, the plasma is a deuterium plasma.

In some embodiments, the plurality of planar shaping coils do not interlock one another. In some embodiments, the plurality of planar shaping coils do not interlock with one another and do not interlock with any one of the plurality of encircling coils.

In some embodiments, plurality of planar encircling coils do not interlock one another. In some embodiments, the plurality of planar encircling coils do not interlock with one another and do not interlock with any one of the plurality of planar shaping coils.

In some embodiments, the stellarator further comprises one or more control coils and/or one or more saddle coils. In some embodiments, the one or more control coils and/or the one or more saddle coils are not superconducting coils.

In some embodiments, a shape of each planar shaping coil of the one or more planar shaping coils is substantially rectangular, substantially rectangular with rounded corners, or substantially circular.

In some embodiments, the stellarator comprises between about 10 and about 10,000 shaping coils. In some embodiments, the stellarator comprises between about 100 and about 2,000 shaping coils. In some embodiments, the stellarator includes between about 3 and about 100 planar encircling coils. In some embodiments, the stellarator comprises at least four planar encircling coils.

In some embodiments, the system comprises at least 2 first negative ion-based neutral beam injectors for introducing the high energy neutral atoms into the plasma in the first angular direction. In some embodiments, the system comprises at least 4 first negative ion-based neutral beam injectors for introducing the high energy neutral atoms into the plasma in the first angular direction. In some embodiments, the system comprises at least 6 first negative ion-based neutral beam injectors for introducing the high energy neutral atoms into the plasma in the first angular direction.

In some embodiments, the system comprises at least one second negative ion-based neutral beam injector for introducing the high energy neutral atoms into the plasma in the second angular direction. In some embodiments, the first and second angular directions are opposite angular directions.

In some embodiments, the system comprises at least two second negative ion-based neutral beam injectors for introducing the high energy neutral atoms into the plasma in the second angular direction. In some embodiments, the first and second angular directions are opposite angular directions.

A fourth additional embodiment is a system for generating neutrons comprising: (i) a casing defining a first volume and having at least two faces; (ii) a blanket defining a second volume; (iii) a stellarator is adapted to confine a plasma within the first volume, and wherein the blanket is positioned between the stellarator and the casing; (iv) at least a first negative ion-based neutral beam injector for introducing first high energy neutral atoms into the plasma in a first angular direction; (v) optionally at least a second negative ion-based neutral beam injector for introducing second high energy neutral atoms into the plasma in a second angular direction; and (vi) an electron heater adapted to heat electrons in the plasma; wherein the stellarator comprises at least two planar shaping coils, wherein a first of the at least two planar shaping coils is positioned near a first of the at least two faces but does not encircle the void, and wherein a second of the at least two planar shaping coils is positioned near a second of the at least two faces but does not encircle the void; and (c) a plurality of planar encircling coils, wherein each individual planar encircling coil of the plurality of encircling coils encircles the plasma axis.

In some embodiments, the at least two faces are on opposite sides of the confined plasma.

In some embodiments, the at least two planar shaping coils do not interlock one another. In some embodiments, the at least two planar shaping coils do not interlock one another and do not interlock any one of the plurality of encircling coils.

In some embodiments, plurality of planar encircling coils do not interlock one another. In some embodiments, the plurality of planar encircling coils do not interlock one another and do not interlock any one of the at least two planar shaping coils.

In some embodiments, the at least two planar shaping coils are comprised of one or more superconducting materials. In some embodiments, the plurality of encircling coils are comprised of one or more superconducting materials. In some embodiments, the plurality of encircling coils and the at least two planar shaping coils are both comprised of one or more superconducting materials.

In some embodiments, the stellarator further comprises one or more control coils and/or one or more saddle coils. In some embodiments, the one or more control coils and/or the one or more saddle coils are not superconducting coils.

In some embodiments, shape of each planar shaping coil of the at least two planar shaping coils is substantially rectangular, substantially rectangular with rounded corners, or substantially circular. In some embodiments, the stellarator includes between about 3 and about 100 planar encircling coils. In some embodiments, the stellarator comprises at least four planar encircling coils.

In some embodiments, the second volume is configured to hold one or more target materials. In some embodiments, the first angular direction is the same as the direction of a flow of the plasma. In some embodiments, the second angular direction is opposite the first angular direction.

In some embodiments, the system further comprises a material transfer system.

In some embodiments, the at least the first and the optional at least the second negative ion-based neutral beam injectors include a source of ions, an accelerator, and a neutralizer.

In some embodiments, the electron heater is an electron cyclotron resonance heating system. In some embodiments, the electron heater is communicatively coupled to a controller. In some embodiments, the controller is adapted to command the electron heater to heat the electrons in the plasma.

In some embodiments, the first and second high energy neutral atoms are deuterium atoms. In some embodiments, the plasma comprises a deuterium plasma.

In some embodiments, the system comprises at least 2 first negative ion-based neutral beam injectors for introducing the high energy neutral atoms into the plasma in the first angular direction. In some embodiments, the system comprises at least 4 first negative ion-based neutral beam injectors for introducing the high energy neutral atoms into the plasma in the first angular direction. In some embodiments, the system comprises at least 6 first negative ion-based neutral beam injectors for introducing the high energy neutral atoms into the plasma in the first angular direction.

In some embodiments, the system comprises at least one second negative ion-based neutral beam injector for introducing the high energy neutral atoms into the plasma in the second angular direction. In some embodiments, the first and second angular directions are opposite angular directions.

In some embodiments, the system comprises at least two second negative ion-based neutral beam injectors for introducing the high energy neutral atoms into the plasma in the second angular direction. In some embodiments, the first and second angular directions are opposite angular directions.

A fifth additional embodiment is a system for generating neutrons comprising: (i) a casing defining a first volume and having at least two faces; (ii) a blanket defining a second volume; (iii) a stellarator is adapted to confine a plasma within the first volume, and wherein the blanket is positioned between the stellarator and the casing; (iv) at least a first negative ion-based neutral beam injector for introducing first high energy neutral atoms into the plasma in a first angular direction; (v) optionally at least a second negative ion-based neutral beam injector for introducing second high energy neutral atoms into the plasma in a second angular direction; and (vi) an electron heater adapted to heat electrons in the plasma; wherein the stellarator comprises (a) a plurality of structural supports; (b) one or more field shaping units operably connected to the plurality of structural supports, each field shaping unit comprising one or more planar, surface-mounted shaping coils; and (c) a plurality of planar encircling coils; wherein the plurality of structural supports, the one or more field shaping units, and the plurality of encircling coils collectively define a void adapted for confining plasma therein.

In some embodiments, the stellarator includes between about 3 and about 100 planar encircling coils. In some embodiments, the stellarator comprises at least four planar encircling coils. In some embodiments, the plurality of planar encircling coils are comprised of one or more superconducting materials. In some embodiments, the plurality of planar encircling coils do not interlock with each other.

In some embodiments, the stellarator comprises at least 4 field shaping units. In some embodiments, each of the one or more planar, surface-mounted shaping coils do not interlock with each other. In some embodiments, a shape of each planar shaping coil of the one or more planar, surface-mounted shaping coils is substantially rectangular, substantially rectangular with rounded corners, or substantially circular.

In some embodiments, each of the one or more field shaping units comprises between about 5 and about 100 planar, surface-mounted shaping coils. In some embodiments, each of the one or more field shaping units comprises between about 5 and about 50 planar, surface-mounted shaping coils. In some embodiments, the one or more planar, surface-mounted shaping coils are comprised of a superconducting material.

In some embodiments, the stellarator further comprises one or more controllers.

In some embodiments, the stellarator further comprises one or more control coils and/or one or more saddle coils. In some embodiments, the one or more control coils and/or the one or more saddles coils are communicatively coupled to a controller. In some embodiments, each of the one or more shaping coils do not individually encircle the plasma.

In some embodiments, the second volume is configured to hold one or more target materials. In some embodiments, the first angular direction is the same as the direction of a flow of the plasma. In some embodiments, the second angular direction is opposite the first angular direction.

In some embodiments, the system further comprises a material transfer system.

In some embodiments, the at least the first and the optional at least the second negative ion-based neutral beam injectors include a source of ions, an accelerator, and a neutralizer.

In some embodiments, the electron heater is an electron cyclotron resonance heating system. In some embodiments, the electron heater is communicatively coupled to a controller. In some embodiments, the controller is adapted to command the electron heater to heat the electrons in the plasma.

In some embodiments, the first and second high energy neutral atoms are deuterium atoms. In some embodiments, the plasma comprises a deuterium plasma.

In some embodiments, the system comprises at least 2 first negative ion-based neutral beam injectors for introducing the high energy neutral atoms into the plasma in the first angular direction. In some embodiments, the system comprises at least 4 first negative ion-based neutral beam injectors for introducing the high energy neutral atoms into the plasma in the first angular direction. In some embodiments, the system comprises at least 6 first negative ion-based neutral beam injectors for introducing the high energy neutral atoms into the plasma in the first angular direction.

In some embodiments, the system comprises at least one second negative ion-based neutral beam injector for introducing the high energy neutral atoms into the plasma in the second angular direction. In some embodiments, the first and second angular directions are opposite angular directions.

In some embodiments, the system comprises at least two second negative ion-based neutral beam injectors for introducing the high energy neutral atoms into the plasma in the second angular direction. In some embodiments, the first and second angular directions are opposite angular directions.

A sixth additional embodiment is a system for generating neutrons comprising: (i) a casing defining a first volume; (ii) a blanket defining a second volume, the blanket enveloping the casing; (iii) a stellarator optimized for fast particle confinement, wherein the stellarator is adapted to confine a plasma within the first volume, and wherein the stellarator encompasses the blanket; (iv) at least a first negative ion-based neutral beam injector for introducing first high energy neutral atoms into the plasma in a first angular direction; (v) optionally at least a second negative ion-based neutral beam injector for introducing second high energy neutral atoms into the plasma in a second angular direction; and (vi) an electron heater adapted to heat electrons in the plasma; wherein the stellarator comprises (a) a field-shaping coil system including one or more field shaping units, wherein each field shaping unit comprises (i) one or more structural mounting elements; and (ii) one or more planar shaping coils disposed on a surface of the one or more structural mounting elements; and (b) a plurality of planar encircling coils which encircle the field-shaping coil system. Since the field-shaping coil system defines a void which confines the plasma, and since the planar encircling coils encircle the field-shaping coil system, the planar encircling coils therefore encircle the plasma confined within the void. In some embodiments, the stellarator does not include any non-planar coils.

In some embodiments, the stellarator further comprises one or more controllers. In some embodiments, the stellarator further comprises one or more control coils and/or one or more saddle coils. In some embodiments, the one or more control coils and/or the one or more saddles coils are communicatively coupled to a controller.

In some embodiments, each of the one or more of planar shaping coils are superconducting coils. In some embodiments, each of the plurality of planar encircling coils are superconducting coils. In some embodiments, both the plurality of planar shaping coils and the plurality of planar encircling coils are superconducting coils.

In some embodiments, the stellarator includes between about 3 and about 100 planar encircling coils. In some embodiments, the stellarator comprises at least four planar encircling coils. In some embodiments, the plurality of planar encircling coils are comprised of one or more superconducting materials. In some embodiments, the plurality of planar encircling coils do not interlock with each other. In some embodiments, the plurality of planar encircling coils do not interlock with each other and do not interlock with any of the shaping coils.

In some embodiments, the stellarator comprises at least 4 field shaping units. In some embodiments, each of the one or more field shaping units comprises one structural mounting element. In some embodiments, the one structural mounting element is wedge shaped. In some embodiments, each of the one or more field shaping units comprises two or more structural mounting elements.

In some embodiments, the one or more planar shaping coils do not interlock with each other. In some embodiments, the one or more planar shaping coils do not interlock with each other and do not interlock with any of the planar encircling coils.

In some embodiments, each of the one or more field shaping units comprises between about 5 and about 100 shaping coils. In some embodiments, each of the one or more field shaping units comprises between about 5 and about 50 shaping coils. In some embodiments, the surface of the one or more structural mounting elements faces the void.

In some embodiments, a shape of each planar shaping coil of the one or more planar shaping coils is substantially rectangular, substantially rectangular with rounded corners, or substantially circular.

In some embodiments, the second volume is configured to hold one or more target materials. In some embodiments, the first angular direction is the same as the direction of a flow of the plasma. In some embodiments, the second angular direction is opposite the first angular direction.

In some embodiments, the system further comprises a material transfer system.

In some embodiments, the at least the first and the optional at least the second negative ion-based neutral beam injectors include a source of ions, an accelerator, and a neutralizer.

In some embodiments, the electron heater is an electron cyclotron resonance heating system. In some embodiments, the electron heater is communicatively coupled to a controller. In some embodiments, the controller is adapted to command the electron heater to heat the electrons in the plasma.

In some embodiments, the first and second high energy neutral atoms are deuterium atoms. In some embodiments, the plasma comprises a deuterium plasma.

In some embodiments, the system comprises at least 2 first negative ion-based neutral beam injectors for introducing the high energy neutral atoms into the plasma in the first angular direction. In some embodiments, the system comprises at least 4 first negative ion-based neutral beam injectors for introducing the high energy neutral atoms into the plasma in the first angular direction. In some embodiments, the system comprises at least 6 first negative ion-based neutral beam injectors for introducing the high energy neutral atoms into the plasma in the first angular direction.

In some embodiments, the system comprises at least one second negative ion-based neutral beam injector for introducing the high energy neutral atoms into the plasma in the second angular direction. In some embodiments, the first and second angular directions are opposite angular directions.

In some embodiments, the system comprises at least two second negative ion-based neutral beam injectors for introducing the high energy neutral atoms into the plasma in the second angular direction. In some embodiments, the first and second angular directions are opposite angular directions.

A seventh additional embodiment is a system for generating neutrons comprising: (i) a casing defining a first volume; (ii) a blanket defining a second volume, the blanket enveloping the casing; (iii) a stellarator optimized for fast particle confinement, wherein the stellarator is adapted to confine a plasma within the first volume, and wherein the stellarator encompasses the blanket; (iv) at least a first negative ion-based neutral beam injector for introducing first high energy neutral atoms into the plasma in a first angular direction; (v) optionally at least a second negative ion-based neutral beam injector for introducing second high energy neutral atoms into the plasma in a second angular direction; and (vi) an electron heater adapted to heat electrons in the plasma; wherein the stellarator comprises (a) a field-shaping coil system including one or more field shaping, wherein each field shaping unit comprises (i) one or more structural mounting elements; and (ii) one or more shaping coils disposed on a surface of the one or more structural mounting elements; and (b) a plurality of encircling coils which encircle the plasma and the field-shaping coil system, wherein the one or more shaping coils and the plurality of encircling coils are comprised of one or more superconducting materials. In some embodiments, each of the one or more shaping coils disposed on the surface of the one or more structural mounting elements does not encircle the plasma. In some embodiments, the one or more shaping coils are planar. In some embodiments, each encircling coil of the plurality of encircling coils are planar.

In some embodiments, a shape of each of the one or more shaping coils is substantially rectangular, substantially rectangular with rounded corners, or substantially circular. In some embodiments, each of the one or more field shaping units comprises between about 5 and about 100 shaping coils. In some embodiments, each of the one or more field shaping units comprises between about 5 and about 50 shaping coils. In some embodiments, the one or more planar shaping coils do not interlock with each other.

In some embodiments, each of the one or more field shaping units comprises one structural mounting element. In some embodiments, the one structural mounting element is wedge shaped. In some embodiments, each of the one or more field shaping units comprises two or more structural mounting elements.

In some embodiments, the plurality of encircling coils encircle the plasma confined within the void. In some embodiments, the stellarator includes between about 3 and about 100 encircling coils. In some embodiments, the stellarator comprises at least four encircling coils.

In some embodiments, the plurality of encircling coils are comprised of one or more superconducting materials. In some embodiments, the plurality of planar encircling coils do not interlock with each other.

In some embodiments, the stellarator further comprises one or more control coils and/or one or more saddle coils. In some embodiments, the one or more control coils and/or the one or more saddles coils are communicatively coupled to a controller.

In some embodiments, the system comprises at least 2 first negative ion-based neutral beam injectors for introducing the high energy neutral atoms into the plasma in the first angular direction. In some embodiments, the system comprises at least 4 first negative ion-based neutral beam injectors for introducing the high energy neutral atoms into the plasma in the first angular direction. In some embodiments, the system comprises at least 6 first negative ion-based neutral beam injectors for introducing the high energy neutral atoms into the plasma in the first angular direction.

In some embodiments, the system comprises at least one second negative ion-based neutral beam injector for introducing the high energy neutral atoms into the plasma in the second angular direction. In some embodiments, the first and second angular directions are opposite angular directions.

In some embodiments, the system comprises at least two second negative ion-based neutral beam injectors for introducing the high energy neutral atoms into the plasma in the second angular direction. In some embodiments, the first and second angular directions are opposite angular directions.

A eighth additional embodiment is a system for generating neutrons comprising: (i) a casing defining a first volume; (ii) a blanket defining a second volume, the blanket enveloping the casing; (iii) a stellarator optimized for fast particle confinement, wherein the stellarator is adapted to confine a plasma within the first volume, and wherein the stellarator encompasses the blanket; (iv) at least a first negative ion-based neutral beam injector for introducing first high energy neutral atoms into the plasma in a first angular direction; (v) optionally at least a second negative ion-based neutral beam injector for introducing second high energy neutral atoms into the plasma in a second angular direction; and (vi) an electron heater adapted to heat electrons in the plasma; wherein the stellarator comprises a plurality of planar shaping coils, wherein an array comprising the plurality of planar shaping coils encircles a plasma axis, but where any individual planar shaping coil of the plurality of planar shaping coils does not encircle the plasma axis; and a plurality of planar encircling coils, wherein each individual planar encircling coil of the plurality of encircling coils encircles the plasma axis. In some embodiments, each of the plurality of planar shaping coils are superconducting coils. In some embodiments, each of the plurality of planar encircling coils are superconducting coils. In some embodiments, both the plurality of planar shaping coils and the plurality of planar encircling coils are superconducting coils. In some embodiments, the plasma is a deuterium plasma.

In some embodiments, the plurality of planar shaping coils do not interlock one another. In some embodiments, the plurality of planar shaping coils do not interlock with one another and do not interlock with any one of the plurality of encircling coils.

In some embodiments, plurality of planar encircling coils do not interlock one another. In some embodiments, the plurality of planar encircling coils do not interlock with one another and do not interlock with any one of the plurality of planar shaping coils.

In some embodiments, the stellarator further comprises one or more control coils and/or one or more saddle coils. In some embodiments, the one or more control coils and/or the one or more saddle coils are not superconducting coils.

In some embodiments, a shape of each planar shaping coil of the one or more planar shaping coils is substantially rectangular, substantially rectangular with rounded corners, or substantially circular.

In some embodiments, the stellarator comprises between about 10 and about 10,000 shaping coils. In some embodiments, the stellarator comprises between about 100 and about 2,000 shaping coils. In some embodiments, the stellarator includes between about 3 and about 100 planar encircling coils. In some embodiments, the stellarator comprises at least four planar encircling coils.

In some embodiments, the second volume is configured to hold one or more target materials. In some embodiments, the first angular direction is the same as the direction of a flow of the plasma. In some embodiments, the second angular direction is opposite the first angular direction.

In some embodiments, the system further comprises a material transfer system.

In some embodiments, the at least the first and the optional at least the second negative ion-based neutral beam injectors include a source of ions, an accelerator, and a neutralizer.

In some embodiments, the electron heater is an electron cyclotron resonance heating system. In some embodiments, the electron heater is communicatively coupled to a controller. In some embodiments, the controller is adapted to command the electron heater to heat the electrons in the plasma.

In some embodiments, the first and second high energy neutral atoms are deuterium atoms. In some embodiments, the plasma comprises a deuterium plasma.

In some embodiments, the system comprises at least 2 first negative ion-based neutral beam injectors for introducing the high energy neutral atoms into the plasma in the first angular direction. In some embodiments, the system comprises at least 4 first negative ion-based neutral beam injectors for introducing the high energy neutral atoms into the plasma in the first angular direction. In some embodiments, the system comprises at least 6 first negative ion-based neutral beam injectors for introducing the high energy neutral atoms into the plasma in the first angular direction.

In some embodiments, the system comprises at least one second negative ion-based neutral beam injector for introducing the high energy neutral atoms into the plasma in the second angular direction. In some embodiments, the first and second angular directions are opposite angular directions.

In some embodiments, the system comprises at least two second negative ion-based neutral beam injectors for introducing the high energy neutral atoms into the plasma in the second angular direction. In some embodiments, the first and second angular directions are opposite angular directions.

A ninth additional embodiment is a system for generating neutrons comprising: (i) a casing defining a first volume; (ii) a blanket defining a second volume, the blanket enveloping the casing; (iii) a stellarator optimized for fast particle confinement, wherein the stellarator is adapted to confine a plasma within the first volume, and wherein the stellarator encompasses the blanket; (iv) at least a first negative ion-based neutral beam injector for introducing first high energy neutral atoms into the plasma in a first angular direction; (v) optionally at least a second negative ion-based neutral beam injector for introducing second high energy neutral atoms into the plasma in a second angular direction; and (vi) an electron heater adapted to heat electrons in the plasma; wherein the stellarator comprises at least two planar shaping coils, wherein a first of the at least two planar shaping coils is positioned near a first of the at least two faces but does not encircle the void, and wherein a second of the at least two planar shaping coils is positioned near a second of the at least two faces but does not encircle the void; and (c) a plurality of planar encircling coils, wherein each individual planar encircling coil of the plurality of encircling coils encircles the plasma axis.

In some embodiments, the at least two faces are on opposite sides of the confined plasma.

In some embodiments, the at least two planar shaping coils do not interlock one another. In some embodiments, the at least two planar shaping coils do not interlock one another and do not interlock any one of the plurality of encircling coils.

In some embodiments, plurality of planar encircling coils do not interlock one another. In some embodiments, the plurality of planar encircling coils do not interlock one another and do not interlock any one of the at least two planar shaping coils.

In some embodiments, the at least two planar shaping coils are comprised of one or more superconducting materials. In some embodiments, the plurality of encircling coils are comprised of one or more superconducting materials. In some embodiments, the plurality of encircling coils and the at least two planar shaping coils are both comprised of one or more superconducting materials.

In some embodiments, the stellarator further comprises one or more control coils and/or one or more saddle coils. In some embodiments, the one or more control coils and/or the one or more saddle coils are not superconducting coils.

In some embodiments, shape of each planar shaping coil of the at least two planar shaping coils is substantially rectangular, substantially rectangular with rounded corners, or substantially circular. In some embodiments, the stellarator includes between about 3 and about 100 planar encircling coils. In some embodiments, the stellarator comprises at least four planar encircling coils.

In some embodiments, the second volume is configured to hold one or more target materials. In some embodiments, the first angular direction is the same as the direction of a flow of the plasma. In some embodiments, the second angular direction is opposite the first angular direction.

In some embodiments, the system further comprises a material transfer system.

In some embodiments, the at least the first and the optional at least the second negative ion-based neutral beam injectors include a source of ions, an accelerator, and a neutralizer.

In some embodiments, the electron heater is an electron cyclotron resonance heating system. In some embodiments, the electron heater is communicatively coupled to a controller. In some embodiments, the controller is adapted to command the electron heater to heat the electrons in the plasma.

In some embodiments, the first and second high energy neutral atoms are deuterium atoms. In some embodiments, the plasma comprises a deuterium plasma.

In some embodiments, the system comprises at least 2 first negative ion-based neutral beam injectors for introducing the high energy neutral atoms into the plasma in the first angular direction. In some embodiments, the system comprises at least 4 first negative ion-based neutral beam injectors for introducing the high energy neutral atoms into the plasma in the first angular direction. In some embodiments, the system comprises at least 6 first negative ion-based neutral beam injectors for introducing the high energy neutral atoms into the plasma in the first angular direction.

In some embodiments, the system comprises at least one second negative ion-based neutral beam injector for introducing the high energy neutral atoms into the plasma in the second angular direction. In some embodiments, the first and second angular directions are opposite angular directions.

In some embodiments, the system comprises at least two second negative ion-based neutral beam injectors for introducing the high energy neutral atoms into the plasma in the second angular direction. In some embodiments, the first and second angular directions are opposite angular directions.

A tenth additional embodiment is a system for generating neutrons comprising: (i) a casing defining a first volume; (ii) a blanket defining a second volume, the blanket enveloping the casing; (iii) a stellarator optimized for fast particle confinement, wherein the stellarator is adapted to confine a plasma within the first volume, and wherein the stellarator encompasses the blanket; (iv) at least a first negative ion-based neutral beam injector for introducing first high energy neutral atoms into the plasma in a first angular direction; (v) optionally at least a second negative ion-based neutral beam injector for introducing second high energy neutral atoms into the plasma in a second angular direction; and (vi) an electron heater adapted to heat electrons in the plasma; wherein the stellarator comprises (a) a plurality of structural supports; (b) one or more field shaping units operably connected to the plurality of structural supports, each field shaping unit comprising one or more planar, surface-mounted shaping coils; and (c) a plurality of planar encircling coils; wherein the plurality of structural supports, the one or more field shaping units, and the plurality of encircling coils collectively define a void adapted for confining plasma therein.

In some embodiments, the stellarator includes between about 3 and about 100 planar encircling coils. In some embodiments, the stellarator comprises at least four planar encircling coils. In some embodiments, the plurality of planar encircling coils are comprised of one or more superconducting materials. In some embodiments, the plurality of planar encircling coils do not interlock with each other.

In some embodiments, the stellarator comprises at least 4 field shaping units. In some embodiments, each of the one or more planar, surface-mounted shaping coils do not interlock with each other. In some embodiments, a shape of each planar shaping coil of the one or more planar, surface-mounted shaping coils is substantially rectangular, substantially rectangular with rounded corners, or substantially circular.

In some embodiments, each of the one or more field shaping units comprises between about 5 and about 100 planar, surface-mounted shaping coils. In some embodiments, each of the one or more field shaping units comprises between about 5 and about 50 planar, surface-mounted shaping coils. In some embodiments, the one or more planar, surface-mounted shaping coils are comprised of a superconducting material.

In some embodiments, the stellarator further comprises one or more controllers.

In some embodiments, the stellarator further comprises one or more control coils and/or one or more saddle coils. In some embodiments, the one or more control coils and/or the one or more saddles coils are communicatively coupled to a controller. In some embodiments, each of the one or more shaping coils do not individually encircle the plasma.

In some embodiments, the second volume is configured to hold one or more target materials. In some embodiments, the first angular direction is the same as the direction of a flow of the plasma. In some embodiments, the second angular direction is opposite the first angular direction.

In some embodiments, the system further comprises a material transfer system.

In some embodiments, the at least the first and the optional at least the second negative ion-based neutral beam injectors include a source of ions, an accelerator, and a neutralizer.

In some embodiments, the electron heater is an electron cyclotron resonance heating system. In some embodiments, the electron heater is communicatively coupled to a controller. In some embodiments, the controller is adapted to command the electron heater to heat the electrons in the plasma.

In some embodiments, the first and second high energy neutral atoms are deuterium atoms. In some embodiments, the plasma comprises a deuterium plasma.

In some embodiments, the system comprises at least 2 first negative ion-based neutral beam injectors for introducing the high energy neutral atoms into the plasma in the first angular direction. In some embodiments, the system comprises at least 4 first negative ion-based neutral beam injectors for introducing the high energy neutral atoms into the plasma in the first angular direction. In some embodiments, the system comprises at least 6 first negative ion-based neutral beam injectors for introducing the high energy neutral atoms into the plasma in the first angular direction.

In some embodiments, the system comprises at least one second negative ion-based neutral beam injector for introducing the high energy neutral atoms into the plasma in the second angular direction. In some embodiments, the first and second angular directions are opposite angular directions.

In some embodiments, the system comprises at least two second negative ion-based neutral beam injectors for introducing the high energy neutral atoms into the plasma in the second angular direction. In some embodiments, the first and second angular directions are opposite angular directions.

An eleventh additional embodiment of the present disclosure is a system for generating neutrons comprising: (i) a casing defining a first volume; (ii) a blanket defining a second volume, the blanket enveloping the casing; (iii) a stellarator optimized for fast particle confinement, wherein the stellarator is adapted to confine a plasma within the first volume, and wherein the stellarator encompasses the blanket; (iv) at least a first negative ion-based neutral beam injector for introducing first beam of high energy neutral atoms into the plasma in a first angular direction; (v) optionally at least a second negative ion-based neutral beam injector for introducing a second beam of high energy neutral atoms into the plasma in a second angular direction; and (vi) an electron heater adapted to heat electrons in the plasma.

In some embodiments, the stellarator optimized for fast particle confinement is a quasi-axisymmetric stellarator. In some embodiments, the stellarator optimized for fast particle confinement is a quasi-symmetric stellarator. In some embodiments, the stellarator optimized for fast particle confinement is a quasi-isodynamic stellarator. In some embodiments, the stellarator optimized for fast particle confinement is quasi-omnigenous stellarator.

In some embodiments, the stellarator optimized for fast particle confinement comprises (a) a plurality of planar shaping coils, wherein an array comprising the plurality of planar shaping coils encircles the plasma axis, but where any individual planar shaping coil of the plurality of planar shaping coils does not encircle the plasma axis; and (b) a plurality of planar encircling coils, wherein each individual planar encircling coil of the plurality of encircling coils encircles the plasma axis.

In some embodiments, the stellarator optimized for fast particle confinement comprises (a) a field-shaping coil system including one or more field shaping units which define a void adapted to confine a plasma, wherein each field shaping unit comprises (i) one or more structural mounting elements; and (ii) one or more shaping coils disposed on a surface of the one or more structural mounting elements; and (b) a plurality of encircling coils which encircle the plasma and the field-shaping coil system, wherein the one or more shaping coils and the plurality of encircling coils are comprised of one or more superconducting materials.

In some embodiments, the stellarator optimized for fast particle confinement comprises (a) a void adapted to confine a plasma having a plasma axis; (b) a plurality of planar shaping coils, wherein an array comprising the plurality of planar shaping coils encircles the plasma axis, but where any individual planar shaping coil of the plurality of planar shaping coils does not encircle the plasma axis; and (c) a plurality of planar encircling coils, wherein each individual planar encircling coil of the plurality of encircling coils encircles the plasma axis.

In some embodiments, the stellarator optimized for fast particle confinement comprises (a) a void adapted to confine a plasma, wherein the void comprises at least two faces; (b) at least two planar shaping coils, wherein a first of the at least two planar shaping coils is proximal to a first of the at least two faces but does not encircle the void, and wherein a second of the at least two planar shaping coils is proximal to a second of the at least two faces but does not encircle the void; and (c) a plurality of planar encircling coils, wherein each individual planar encircling coil of the plurality of encircling coils encircles the plasma axis.

In some embodiments, the stellarator optimized for fast particle confinement comprises (a) a plurality of structural supports; (b) one or more field shaping units operably connected to the plurality of structural supports, each field shaping unit comprising one or more planar, surface-mounted shaping coils; and (c) a plurality of planar encircling coils; wherein the plurality of structural supports, the one or more field shaping units, and the plurality of encircling coils collectively define a void adapted for confining plasma therein.

In some embodiments, the second volume is configured to hold one or more target materials. In some embodiments, the first angular direction is the same as the direction of a flow of the plasma. In some embodiments, the second angular direction is opposite the first angular direction.

In some embodiments, the system further comprises a material transfer system.

In some embodiments, the at least the first and the optional at least the second negative ion-based neutral beam injectors include a source of ions, an accelerator, and a neutralizer.

In some embodiments, the electron heater is an electron cyclotron resonance heating system. In some embodiments, the electron heater is communicatively coupled to a controller. In some embodiments, the controller is adapted to command the electron heater to heat the electrons in the plasma.

In some embodiments, the first and second high energy neutral atoms are deuterium atoms. In some embodiments, the plasma comprises a deuterium plasma.

In some embodiments, the system comprises at least 2 first negative ion-based neutral beam injectors for introducing the high energy neutral atoms into the plasma in the first angular direction. In some embodiments, the system comprises at least 4 first negative ion-based neutral beam injectors for introducing the high energy neutral atoms into the plasma in the first angular direction. In some embodiments, the system comprises at least 6 first negative ion-based neutral beam injectors for introducing the high energy neutral atoms into the plasma in the first angular direction.

In some embodiments, the system comprises at least one second negative ion-based neutral beam injector for introducing the high energy neutral atoms into the plasma in the second angular direction. In some embodiments, the first and second angular directions are opposite angular directions.

In some embodiments, the system comprises at least two second negative ion-based neutral beam injectors for introducing the high energy neutral atoms into the plasma in the second angular direction. In some embodiments, the first and second angular directions are opposite angular directions.

A twelfth aspect of the present disclosure is A system comprising: (i) a casing defining a first volume; (ii) a blanket defining a second volume, the blanket enveloping the casing; (iii) a stellarator optimized for fast particle confinement, wherein the stellarator is adapted to confine a plasma within the first volume, and wherein the stellarator encompasses the blanket; (iv) at least a first negative ion-based neutral beam injector for introducing high energy neutral atoms into the plasma in a first angular direction; (v) at least a second negative ion-based neutral beam injector for introducing high energy neutral atoms into the plasma in a second angular direction; and (vi) an electron heater adapted to heat electrons in the plasma.

In some embodiments, the system comprises at least 2 first negative ion-based neutral beam injectors for introducing the high energy neutral atoms into the plasma in the first angular direction. In some embodiments, the system comprises at least 4 first negative ion-based neutral beam injectors for introducing the high energy neutral atoms into the plasma in the first angular direction. In some embodiments, the system comprises at least 6 first negative ion-based neutral beam injectors for introducing the high energy neutral atoms into the plasma in the first angular direction.

In some embodiments, the system comprises at least two second negative ion-based neutral beam injectors for introducing the high energy neutral atoms into the plasma in the second angular direction. In some embodiments, the first and second angular directions are opposite angular directions.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications, and publications to provide yet further embodiments.

Although the present disclosure has been described with reference to a number of illustrative embodiments, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings, and the appended claims without departing from the spirit of the disclosure. In addition to variations and modifications in the component parts and/or arrangements, alternative uses will also be apparent to those skilled in the art.

The invention claimed is:

1. A system comprising: (a) a stellarator adapted to confine a plasma within a first volume, wherein the stellarator includes (i) a casing defining the first volume; and (ii) a blanket defining a second volume, wherein the blanket envelops the casing and thereby radially circumscribes the plasma confined by the stellarator; (b) at least a first negative ion-based neutral beam injector in communication with the stellarator configured to introduce high energy neutral atoms into the plasma confined by the stellarator in a first toroidal direction along a plasma axis; (c) at least a second negative ion-based neutral beam injector in communication with the stellarator configured to introduce high energy neutral atoms into the plasma confined by the stellarator in a second toroidal direction along the plasma axis, wherein the first and second toroidal directions are opposite toroidal directions; and (d) an electron heater in communication with the stellarator, wherein the electron heater is adapted to heat electrons in the plasma; wherein the stellarator comprises (a) a plurality of planar shaping coils, wherein an array comprising the plurality of planar shaping coils encircles the plasma axis, but where any individual planar shaping coil of the plurality of planar shaping coils does not encircle the plasma axis; and (b) a plurality of planar encircling coils, wherein each individual planar encircling coil of the plurality of encircling coils encircles the plasma axis; and wherein any planar shaping coil of the plurality of planar shaping coils does not interlock with any planar encircling coil of the plurality of planar encircling coils.

2. The system of claim 1, wherein the stellarator is a quasi-helically symmetric stellarator, a quasi-isodynamic stellarator, or a quasi-omnigenous stellarator.

3. The system of claim 1, wherein the system comprises at least 2 first negative ion-based neutral beam injectors configured to introduce the high energy neutral atoms into the plasma in the first toroidal direction.

4. The system of claim 1, wherein the system further comprises at least one transfer system in communication with the first volume.

5. The system of claim 4, wherein the system comprises at least two transfer systems, wherein a first of the at least two transfer systems is in communication with the first volume, and wherein a second of the at least two transfer systems is in communication with the second volume.

6. The system of claim 1, wherein the electron heater is communicatively coupled to a controller.

7. A system for generating neutrons comprising: (i) a casing defining a first volume; (ii) a blanket defining a second volume; (iii) a stellarator adapted to confine a plasma within the first volume, and wherein the blanket is positioned between the stellarator and the casing; (iv) at least a first negative ion-based neutral beam injector for introducing high energy neutral atoms into the plasma in a first toroidal direction; and (v) an electron heater adapted to heat electrons in the plasma; wherein the stellarator comprises (a) a plurality of planar shaping coils, wherein an array comprising the plurality of planar shaping coils encircles the plasma axis, but where any individual planar shaping coil of the plurality of planar shaping coils does not encircle the plasma axis; and (b) a plurality of planar encircling coils, wherein each individual planar encircling coil of the plurality of encircling coils encircles the plasma axis; and wherein any planar shaping coil of the plurality of planar shaping coils does not interlock with any planar encircling coil of the plurality of planar encircling coils.

8. The system of claim 7, wherein the system comprises at least 2 first negative ion-based neutral beam injectors for introducing the high energy neutral atoms into the plasma.

9. The system of claim 7, wherein the system further comprises at least one material transfer system.

10. The system of claim 9, wherein a first of the at least one material transfer system is in communication with the first volume.

11. The system of claim 10, wherein the first of the at least one material transfer system is communicatively coupled to a material isolation system.

12. The system of claim 10, wherein a second of the at least one material transfer system is in communication with the second volume.

13. The system of claim 12, wherein the second of the at least one material transfer system is communicatively coupled to a material isolation system.

14. The system of claim 7, wherein the electron heater is communicatively coupled to a controller.

15. A system comprising: (a) a stellarator adapted to confine a plasma within a first volume, wherein the stellarator includes (i) a casing defining the first volume; and (ii) a blanket defining a second volume, the blanket enveloping the casing; (b) at least a first negative ion-based neutral beam injector for introducing high energy neutral atoms into the plasma in a first toroidal direction; (c) at least a second negative ion-based neutral beam injector for introducing high energy neutral atoms into the plasma in a second toroidal direction, wherein the first and second toroidal directions are opposite toroidal directions; and (d) an electron heater adapted to heat electrons in the plasma; wherein the stellarator comprises (i) a field-shaping coil system, wherein each field shaping unit comprises: one or more structural mounting elements; and one or more planar shaping coils disposed on a surface of the one or more structural mounting elements, wherein the one or more planar shaping coils do not interlock with each other, and where each of the one or more shaping coils do not individually encircle the plasma; and (b) a plurality of planar encircling coils which encircle the field-shaping coil system, and wherein each planar encircling coil of the plurality of planar encircling coils do not interlock with each other, and wherein any planar shaping coil of the plurality of planar shaping coils does not interlock with any planar encircling coil of the plurality of planar encircling coils.

* * * * *